United States Patent [19]

Amram

[11] Patent Number: 4,583,615

[45] Date of Patent: Apr. 22, 1986

[54] METHOD AND APPARATUS FOR CONTROLLING NOISE

[76] Inventor: Maurice Amram, P.O. Box 6079, Succ. A, Montreal, Quebec H3C 3A7, Canada

[21] Appl. No.: 582,770

[22] Filed: Feb. 23, 1984

Related U.S. Application Data

[63] Continuation-in-part of Ser. No. 350,765, Feb. 22, 1982, abandoned.

[51] Int. Cl.[4] .................................................. B64F 1/26

[52] U.S. Cl. .................................... 181/210; 181/286; 181/288

[58] Field of Search ................. 181/30, 210, 284, 286, 181/295, 288

[56] References Cited

U.S. PATENT DOCUMENTS 4,069,768 1/1978 Matsumoto et al. ................ 181/210

*Primary Examiner*—L. T. Hix

*Assistant Examiner*—Brian W. Brown

*Attorney, Agent, or Firm*—Watson, Cole, Grindle & Watson

[57] ABSTRACT

The invention relates to a noise control device which is placed between a noise source and an area which is to be protected. The device includes at least one passageway through the body portion with a plurality of chambers extending into the body portion from both sides of the passageway, the chambers and the passageway being sized to cause a 180° phase lag in a sound passing through the passageway, thus causing destructive interference with sound passing over the barrier.

15 Claims, 44 Drawing Figures

1/3 OCTAVE: 100 Hz

1/3 OCTAVE: 50 Hz

1/3 OCTAVE: 80 Hz

1/3 OCTAVE: 100 Hz

1/3 OCTAVE: 125 Hz

1/3 OCTAVE: 200 Hz

1/3 OCTAVE: 1000 Hz

Figure 1:
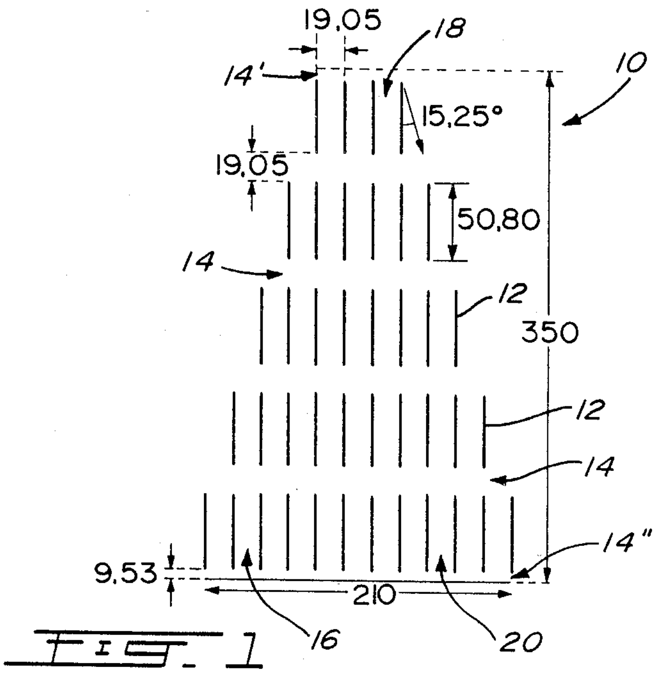

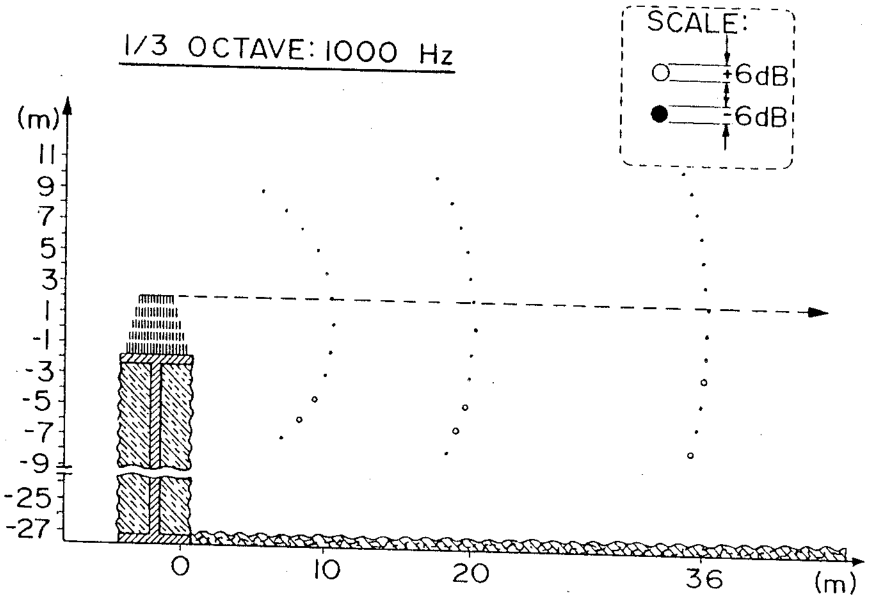
FIG. 8D
FIG. 9
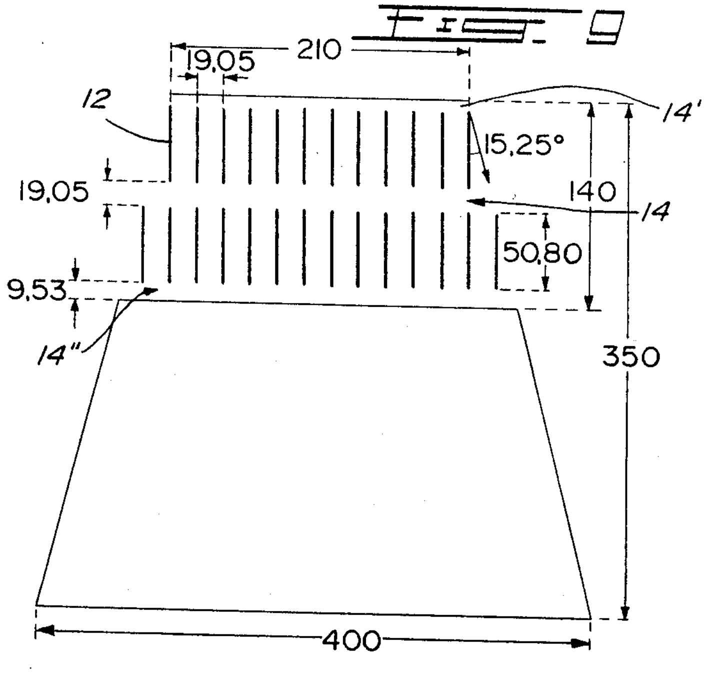

METHOD AND APPARATUS FOR CONTROLLING NOISE

This application is a continuation-in-part of U.S. Ser. No. 350,765, filed Feb. 22, 1982, and now abandoned.

The present invention relates to a noise control device and the method for controlling noises at desired frequencies.

In the art, many types of sound or noise controlling structures are known. Some structures absorb sound as shown, for example, in U.S. Pat. No. 4,113,053. Generally, such structures suffer the disadvantage of employing a great deal of material in their construction and thus are relatively expensive. Other structures are of a relatively solid material acting as a barrier which primarily reflects sounds. Such structures are advantageous in that they are simple; however, sound can pass above the top edge of the barrier and be deflected into areas behind the barrier. Additionally, solid barriers can cause reverberation and in many instances, prevent ventilation in enclosed spaces. Naturally, this is disadvantageous when the structures are employed in uses such as for controlling sound along the side of a roadway.

It is also known to use various arrangements of a plurality of elements to provide passages therebetween to refract and lag in phase the noise passing therethrough. Such structures as shown in U.S. Pat. No. 4,069,768 are taught as being useful for directing the noise to a further sound controlling structure which may be a solid barrier or a sound absorbing structure.

It is an object of the present invention to provide a method of reducing the noise level emanating from a source thereof.

It is also an object of the present invention to provide a method whereby noise within a desired frequency band may be controlled.

It is a further object of the present invention to provide a device which may be placed between the noise source and an area which is desired to be protected, which device will reduce the noise reaching the area.

It is a further object of the present invention to provide a noise control device which is effective, lightweight, and permits ventilation.

According to one aspect of the present invention, there is provided a noise reducing method and a device which is adapted to be placed between a noise source and an area which is to be protected, the noise reducing device comprising a body portion, at least one passageway through the body portion, and a plurality of chambers extending into the body portion from both sides of the passageway, the chambers and passageway being sized to cause a 180° phase lag in sound waves of a desired frequency passing through the passageway.

According to the present invention, there is provided a method of reducing noise to a desired frequency, which method comprises the steps of placing a noise control device between the source of the noise and the place where the noise is to be controlled, the device having a plurality of elements arranged in a plurality of elements arranged in a plurality of rows, at least one passageway permitting the passage of noise therethrough formed between said rows of elements, elements forming a plurality of chambers extending from said passageway, and arranging the elements according to the frequency of the noise to be controlled according to the formula:

$$0 = -\cot\frac{\pi f l}{c} + \frac{2fb}{c}\left\{ Ln\frac{1}{\sin\frac{\pi\delta}{2}} + \sum_{n=1}^{n=10}\left[\frac{\coth\left(\frac{n\pi l}{b}\right)F}{F} - 1\right]\frac{\sin^2\pi n\delta}{n(\pi n\delta)^2}\right\}$$

wherein f = the desired frequency c = the sound propagation velocity $$F = \left[1 - \left(\frac{bf}{nc}\right)^2\right]^{\frac{1}{2}}$$

n = takes the values from 1 to 10 in the series.

b = the vertical distance between the two centers of adjacent strips for open guides, or total width of the wave guide for closed guides b' = the width of the passageways l = the horizontal distance between the strips $\delta = (b'/b)$ $Ln = \log_e$ The ratio of the width of the passages to the width of the elements is between 1:10 to about 4:10.

In one preferred embodiment, the device comprises a plurality of elements arranged in a plurality of rows to form at least one passageway between the rows which will permit the passage of noise therethrough. The elements in the rows are generally aligned in columns to define ducts extending substantially perpendicular to the passageway. The ducts may be closed at the end opposed to the passageway to thereby form a chamber open only to the passageway. The ducts and passageway are sized to cause the phase lag of approximately 180° of sound waves of a desired frequency passing through the passageway.

In another embodiment, the device comprises a plurality of elements arranged in horizontal rows and vertical columns with at least one passageway between the rows and a plurality of ducts between the columns. The ducts are thus substantially continuous from the top to the bottom of the device.

Thus, the vertical ducts may either be continuous or may form closed chambers. In either instance, it is desired to induce a phase lag of 180° in sound passing through the passageway.

The number of passageways may vary and in certain embodiments, a single passageway is suitable and desirable. Particularly, when the ducts are closed to form chambers, fewer passageways may be employed. In one particular embodiment, there may be provided three passageways, with a first upper passageway adapted to induce a 180° phase lag in sound waves passing therethrough, the second one adapted to induce a 180° phase lag and third one adapted to induce a 360° phase lag. This creates a double "dipole" effect with the upper passageway, which causes a 180° phase lag in the sound waves of a certain frequency, destructively interfering with sound waves diffracted at the top of the barrier.

The lowermost passageway will similarly destructively interfere with the waves passing through the intermediate passageway. This arrangement benefit of a solid ground which transform this dipole effect in a quadrupole one (weaker sound radiator).

As will be appreciated by those skilled in the art, the configuration of the device may vary. However, the configuration and design of the device is preferably such as to minimize diffraction of sound waves passing through the passageways and to this end, the fact of the device is preferably substantially vertical for reasons which will become apparent hereinbelow.

Figure 2A:
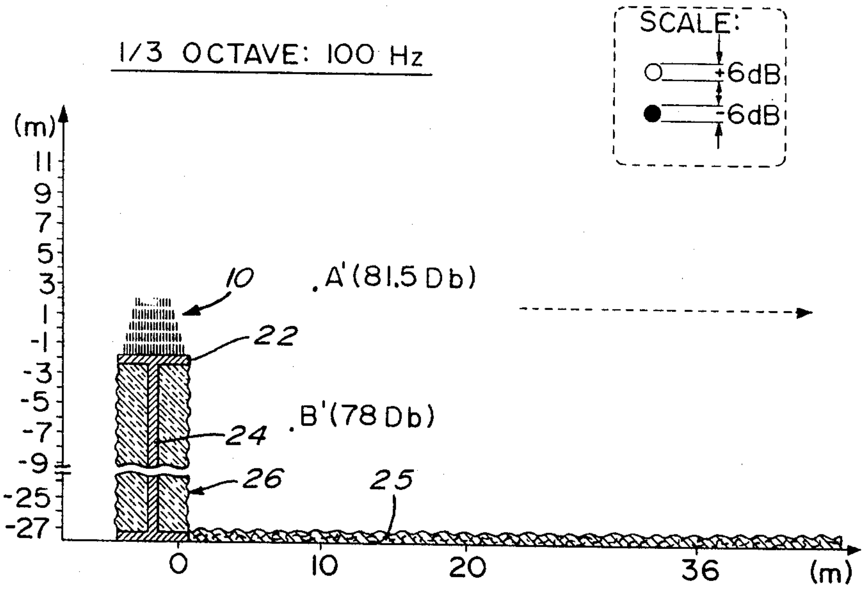
Figure 3A:
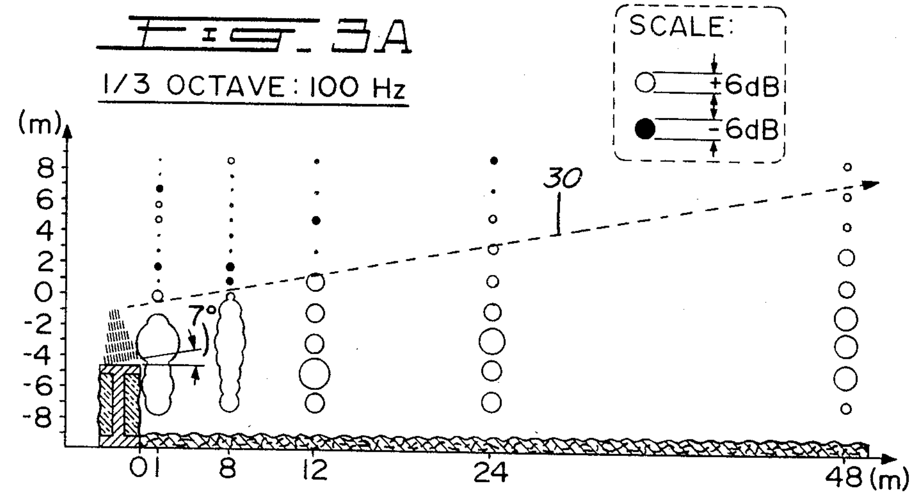
Figure 4:
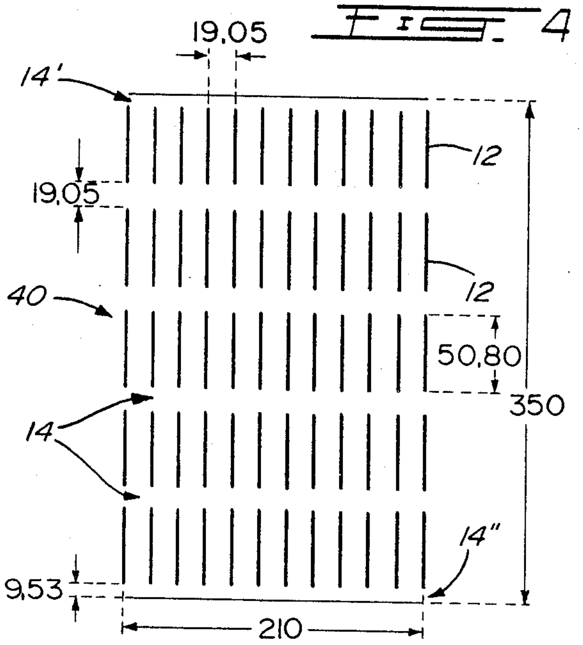
Figure 5A:
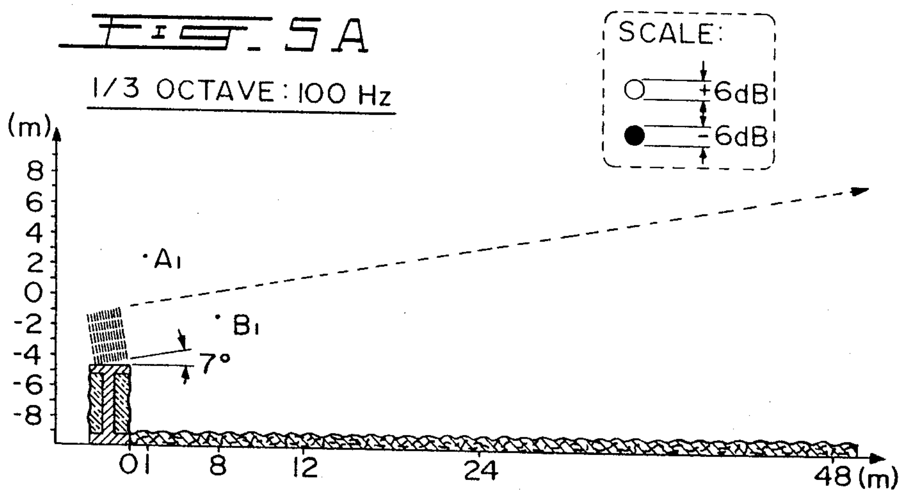
Figure 6A:
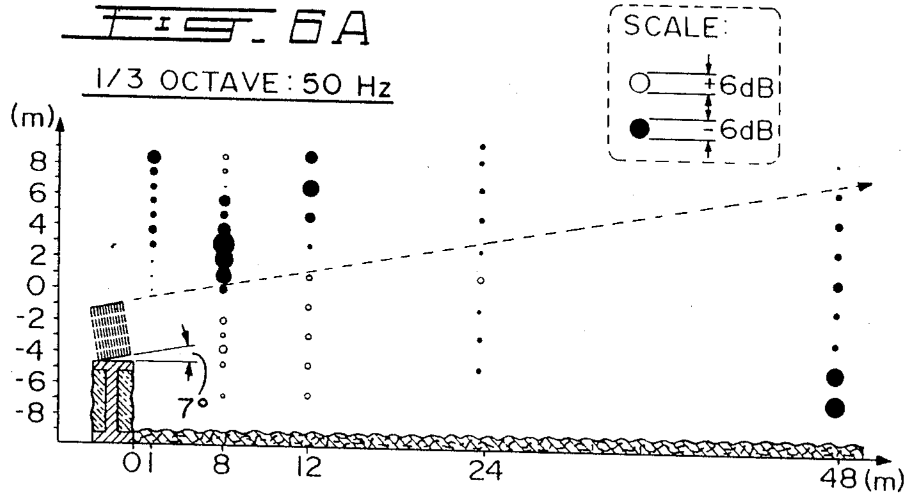
Figure 6B:
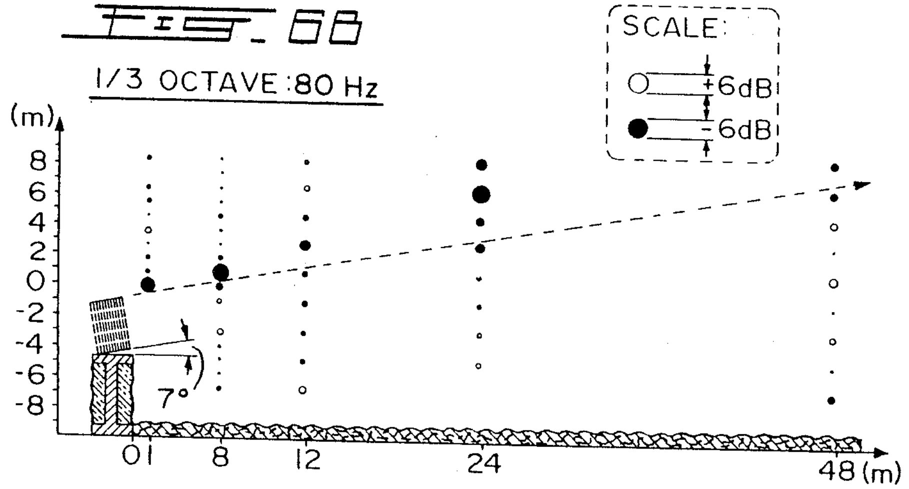
Figure 6C:
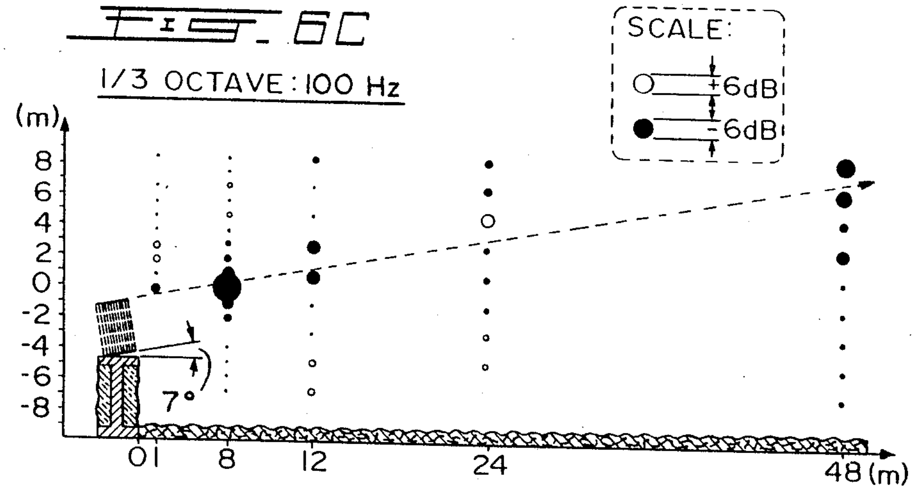
Figure 6D:
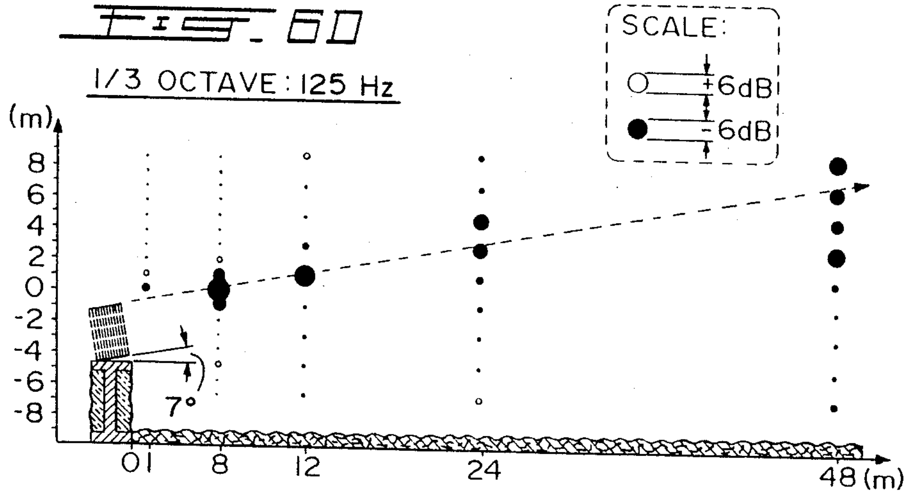
Figure 6E:
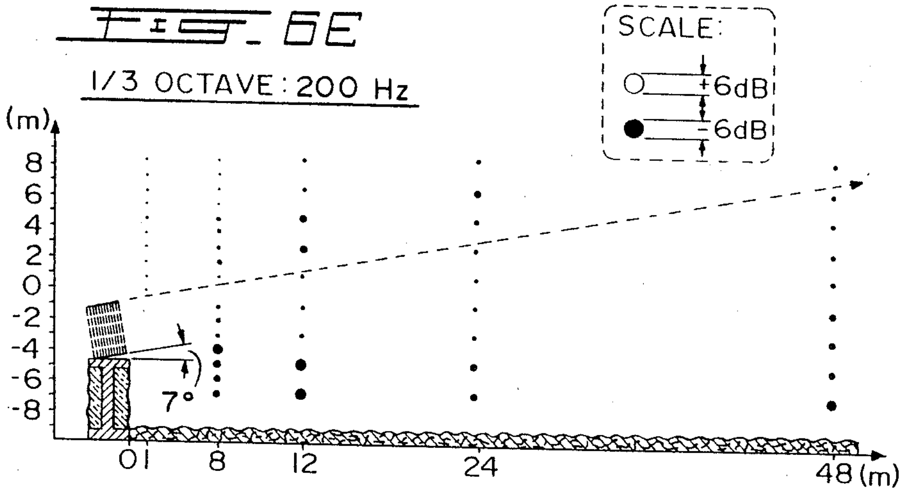
Figure 6F:
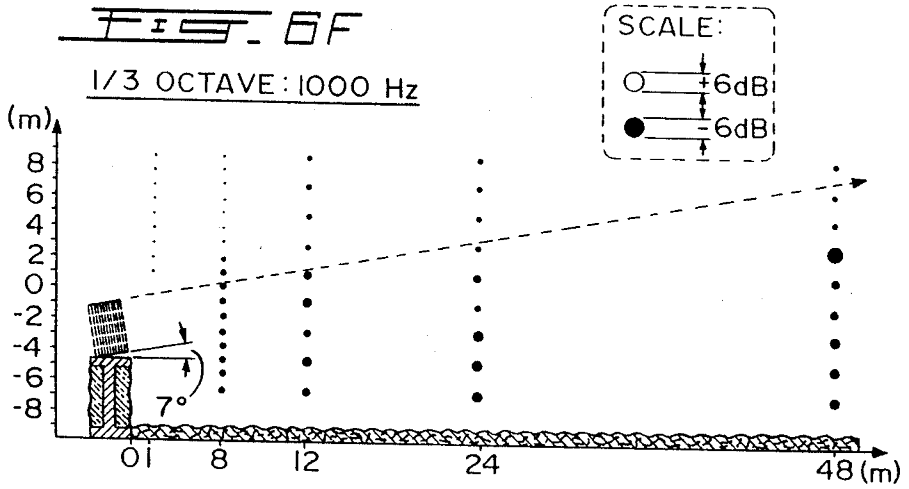
Figure 7:
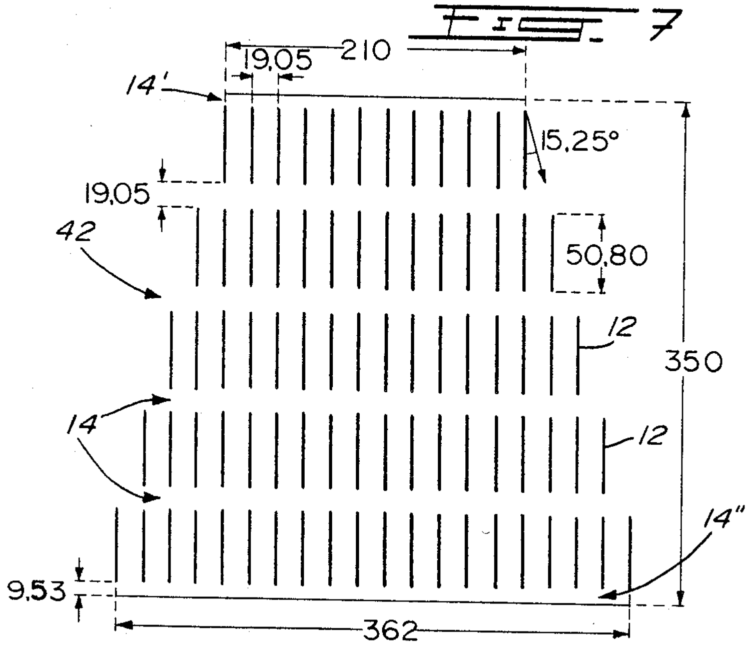
Figure 8A:
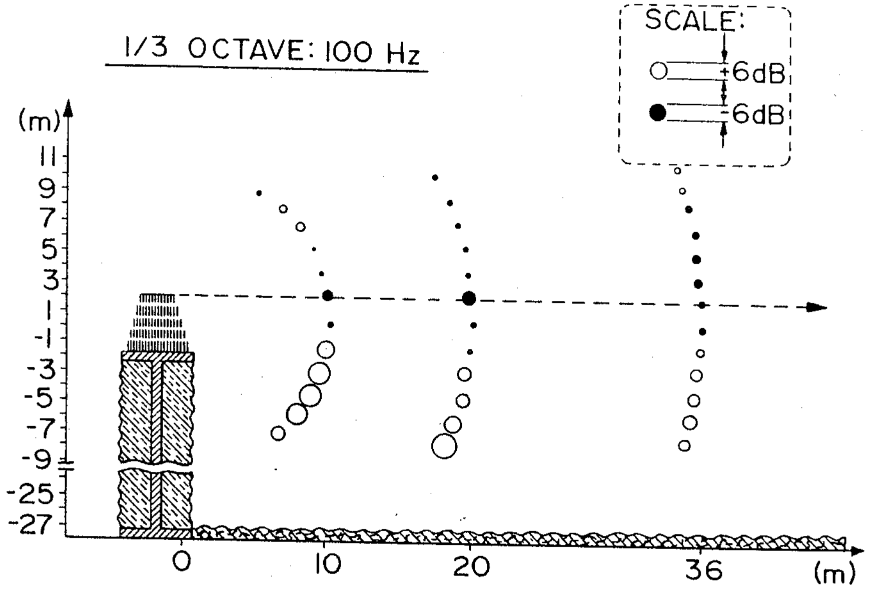
Figure 8B:
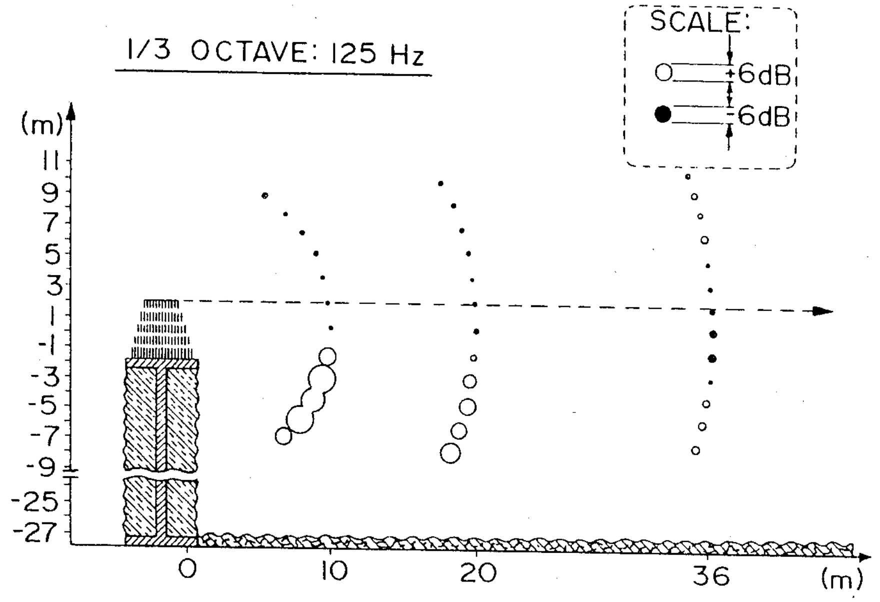
Figure 8C:
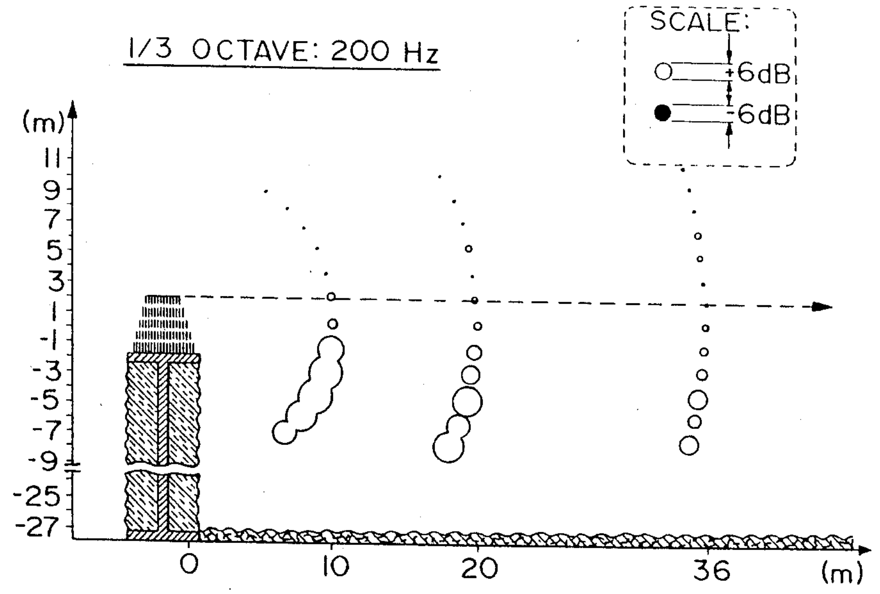
Figure 10A:
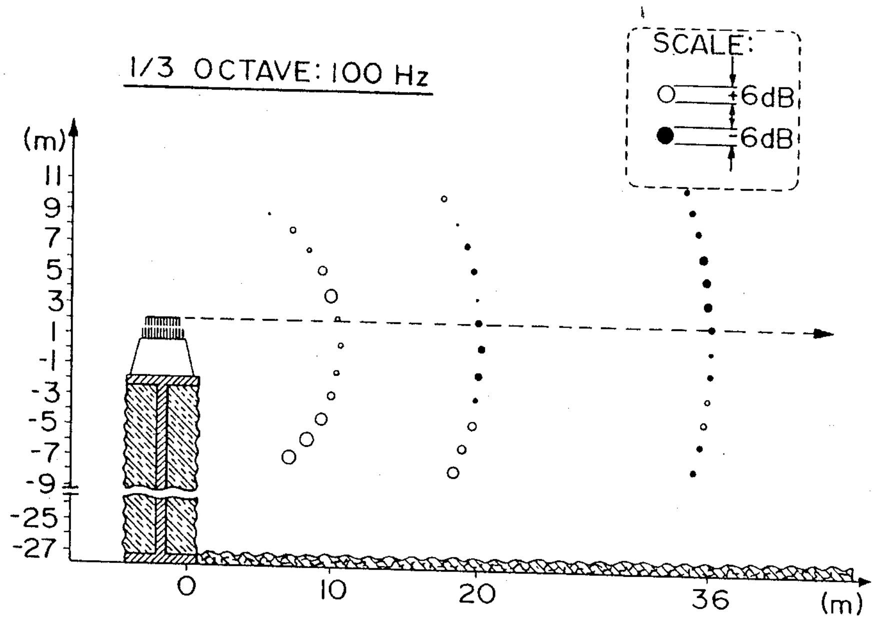
Figure 10B:
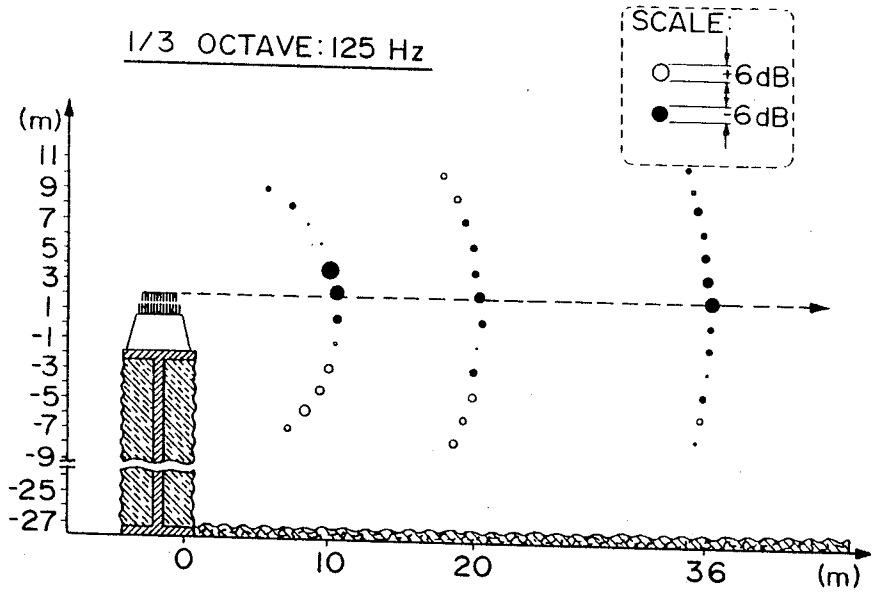
Figure 10C:
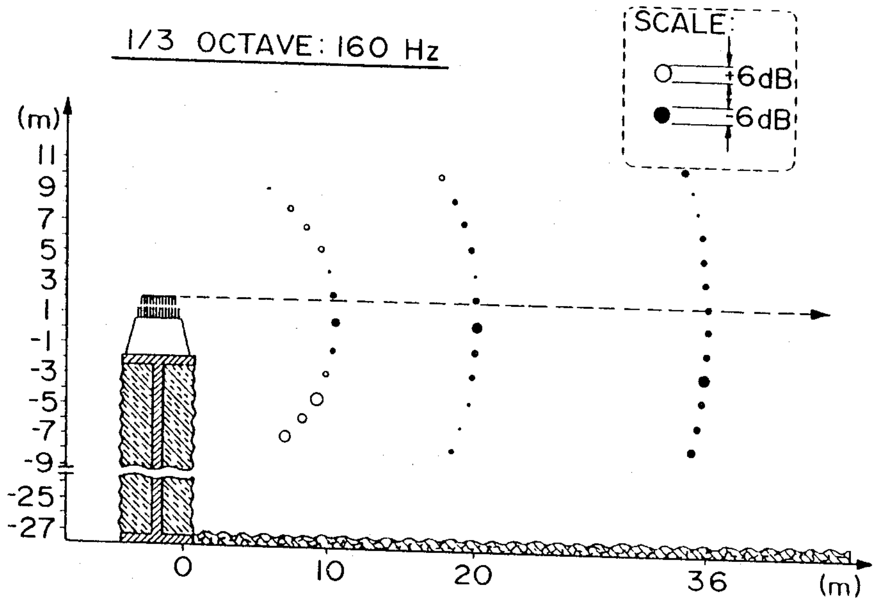
Figure 10D:
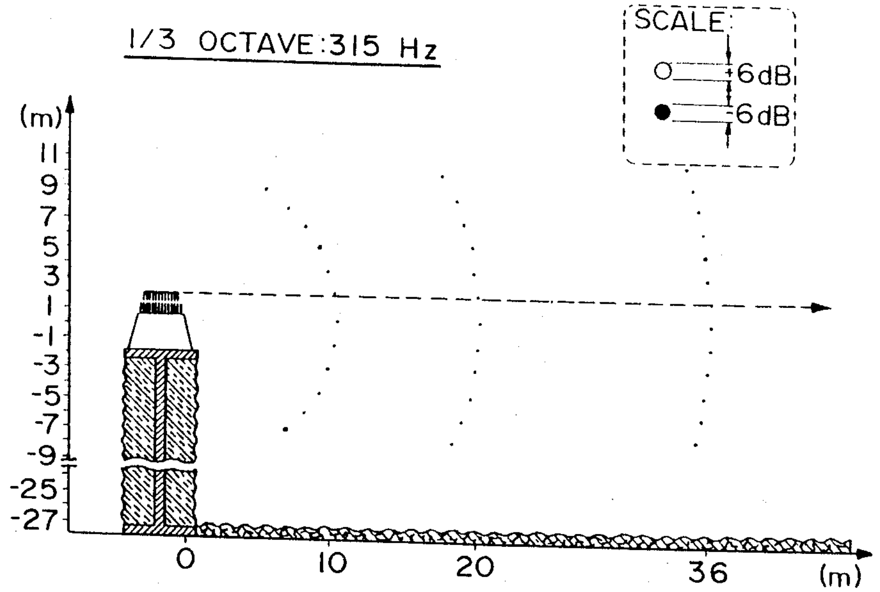
Figure 11:
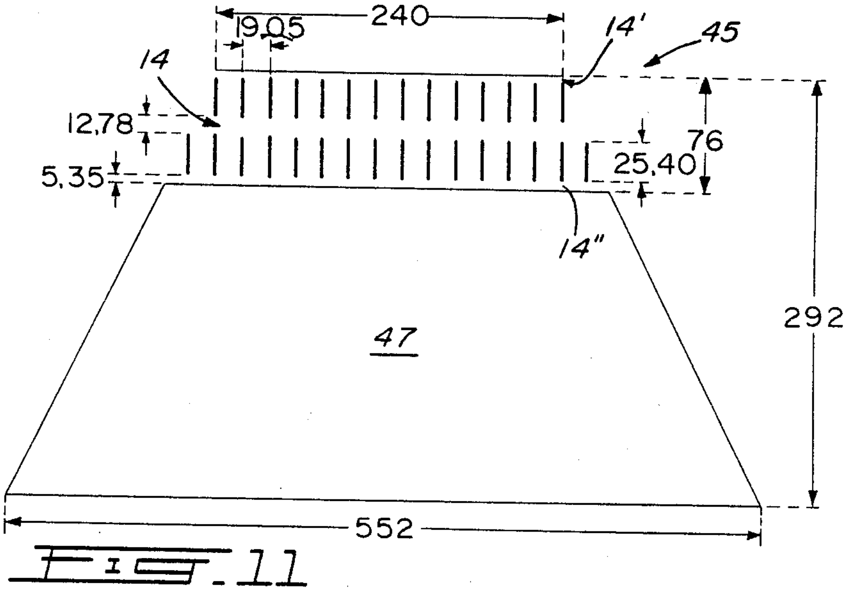
Figure 12A:
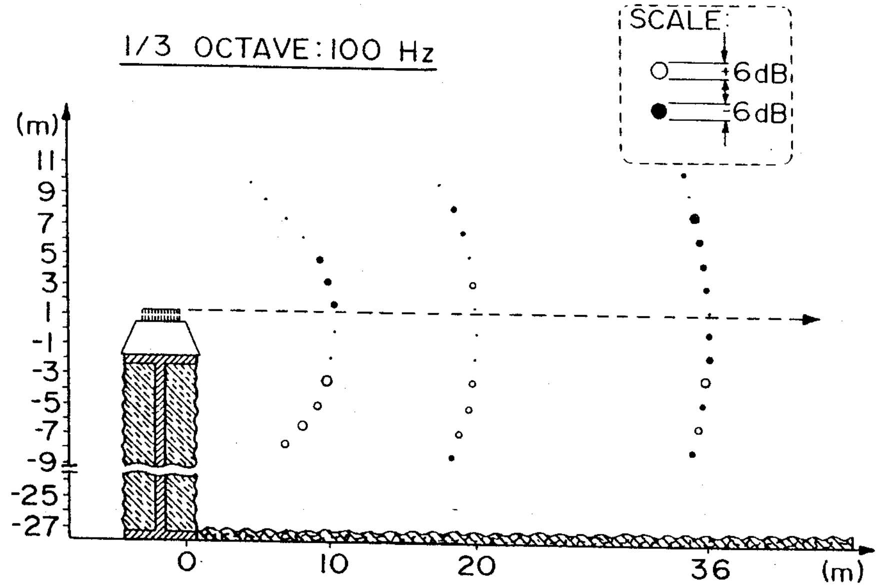
Figure 12B:
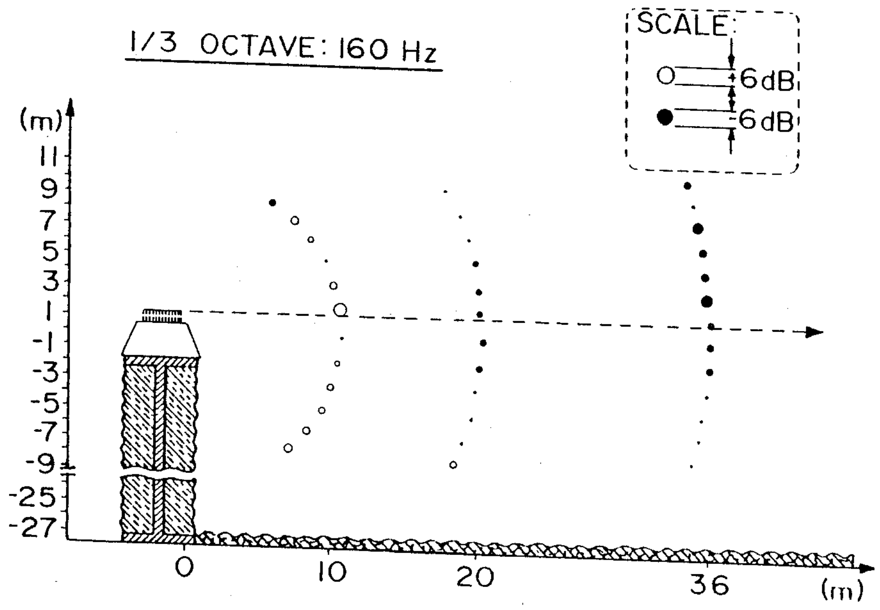
Figure 12C:
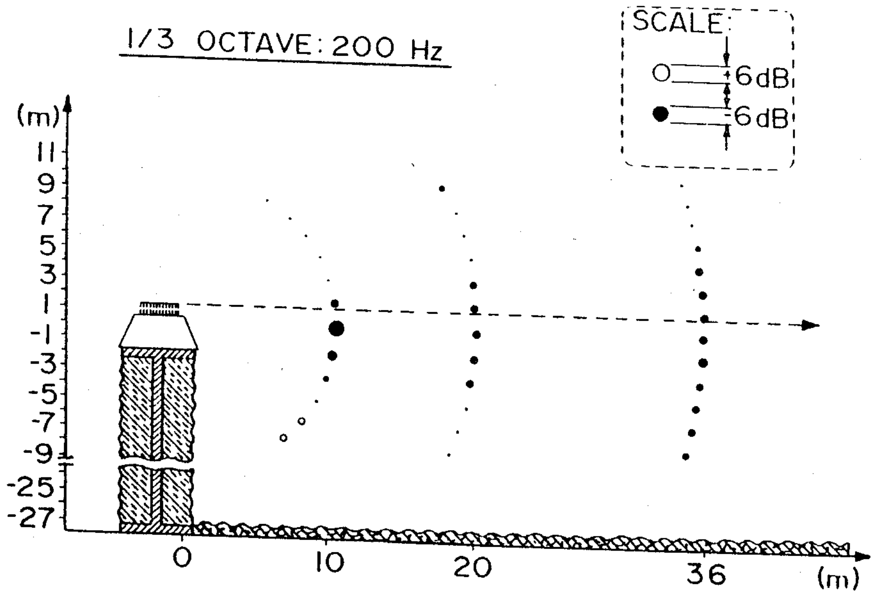
Figure 12D:
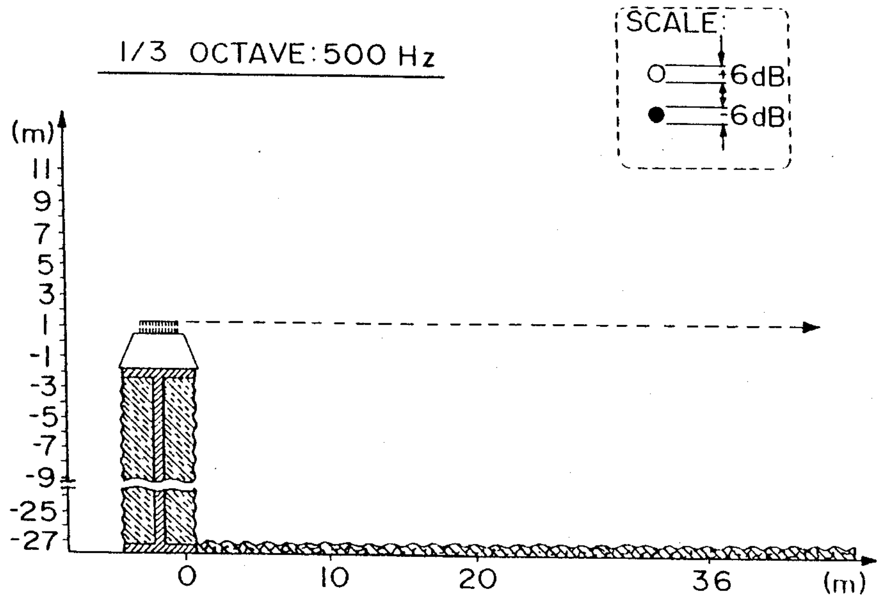
Figure 13:
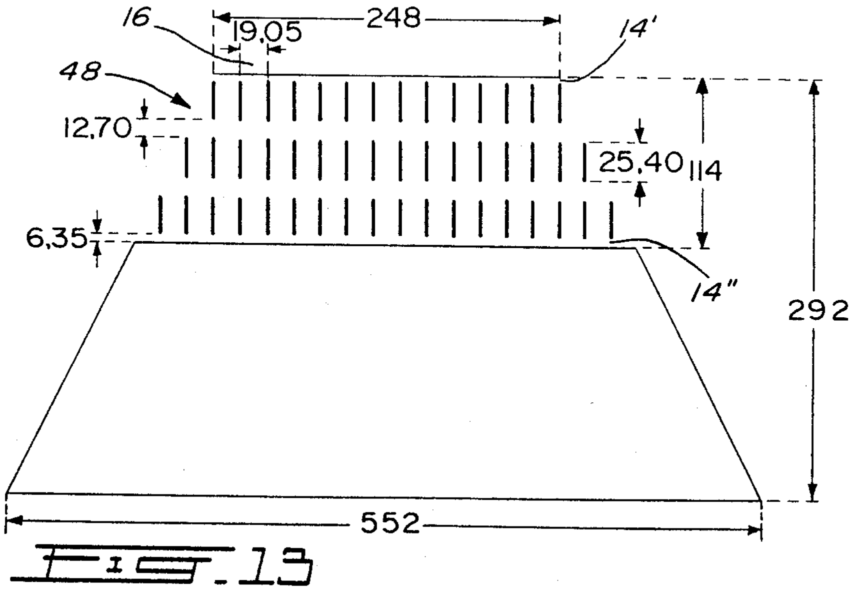
Figure 14A:
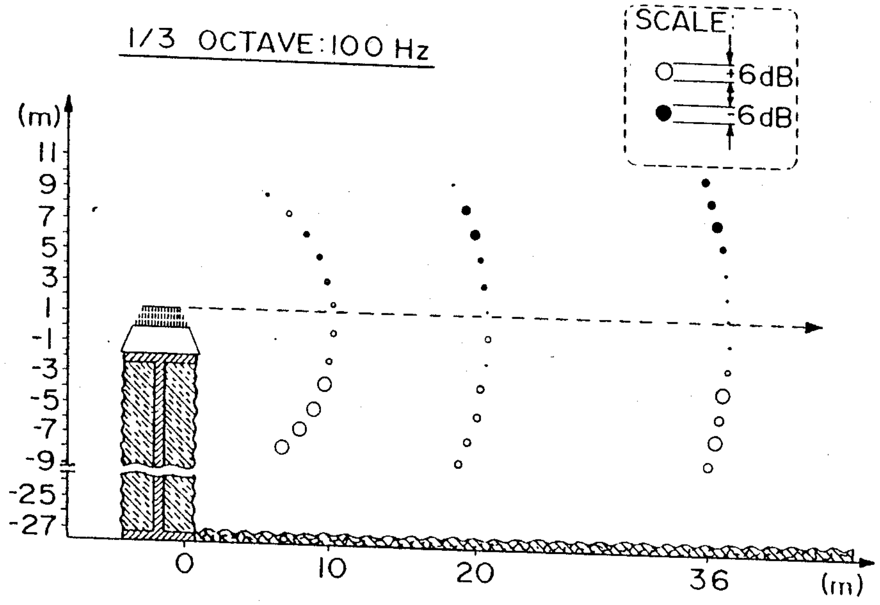
Figure 14B:
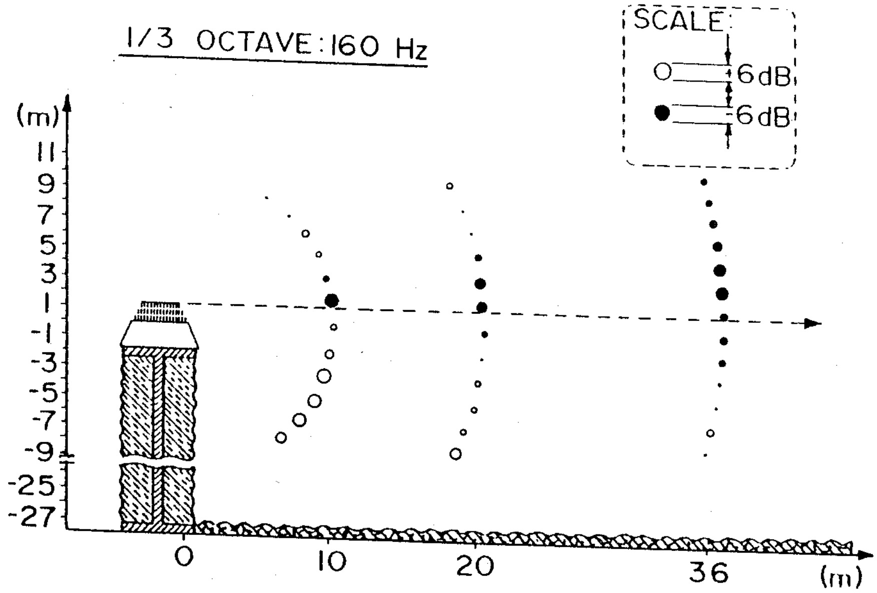
Figure 14C:
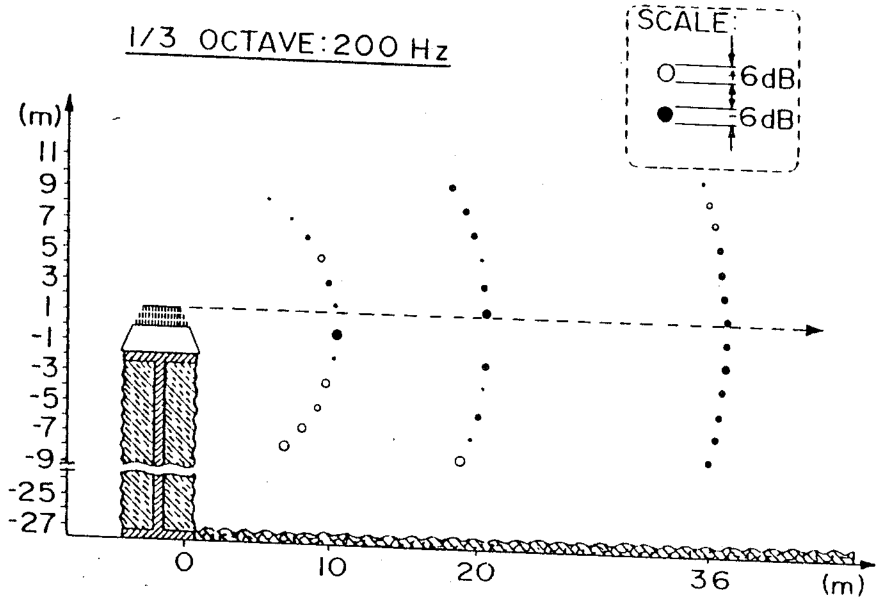
Figure 14D:
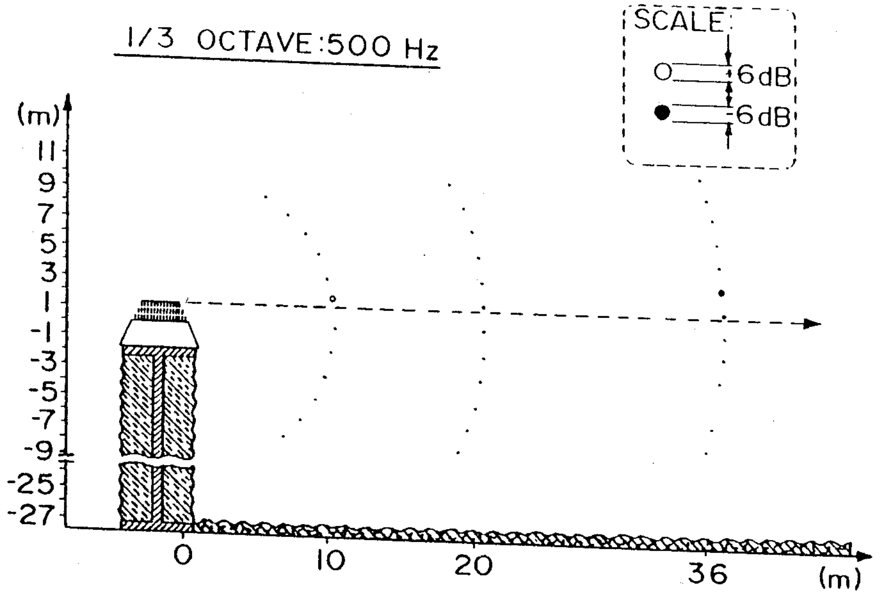
Figure 15:
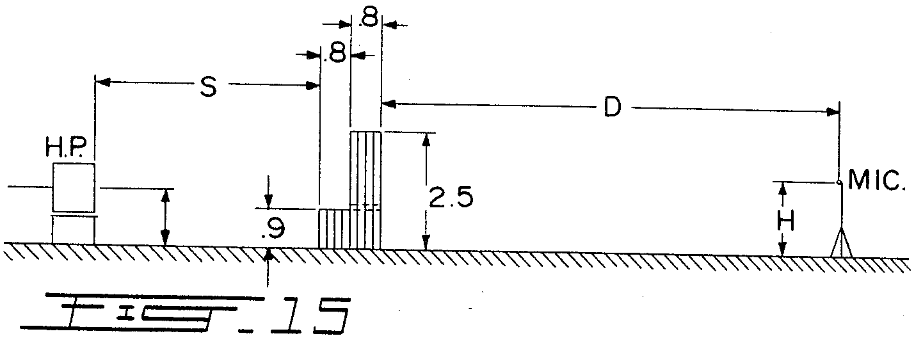
Figure 17:
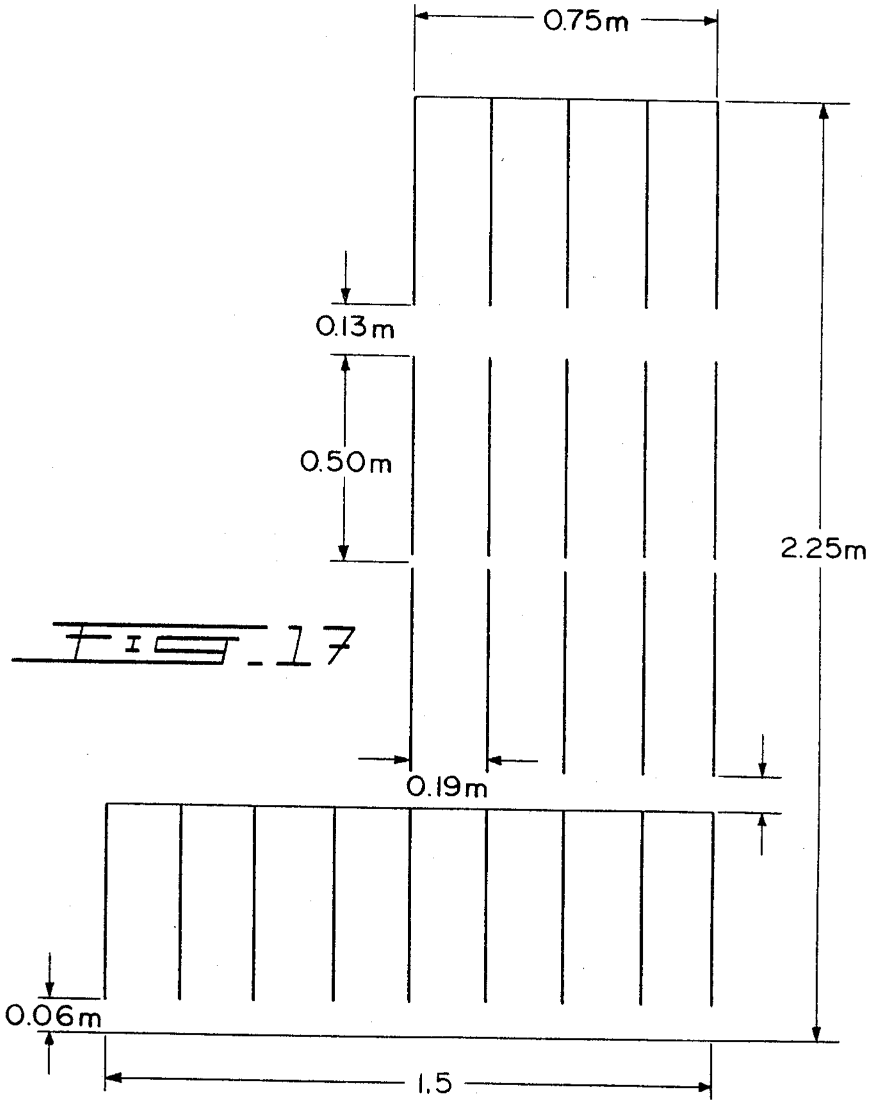
Figure 16A:
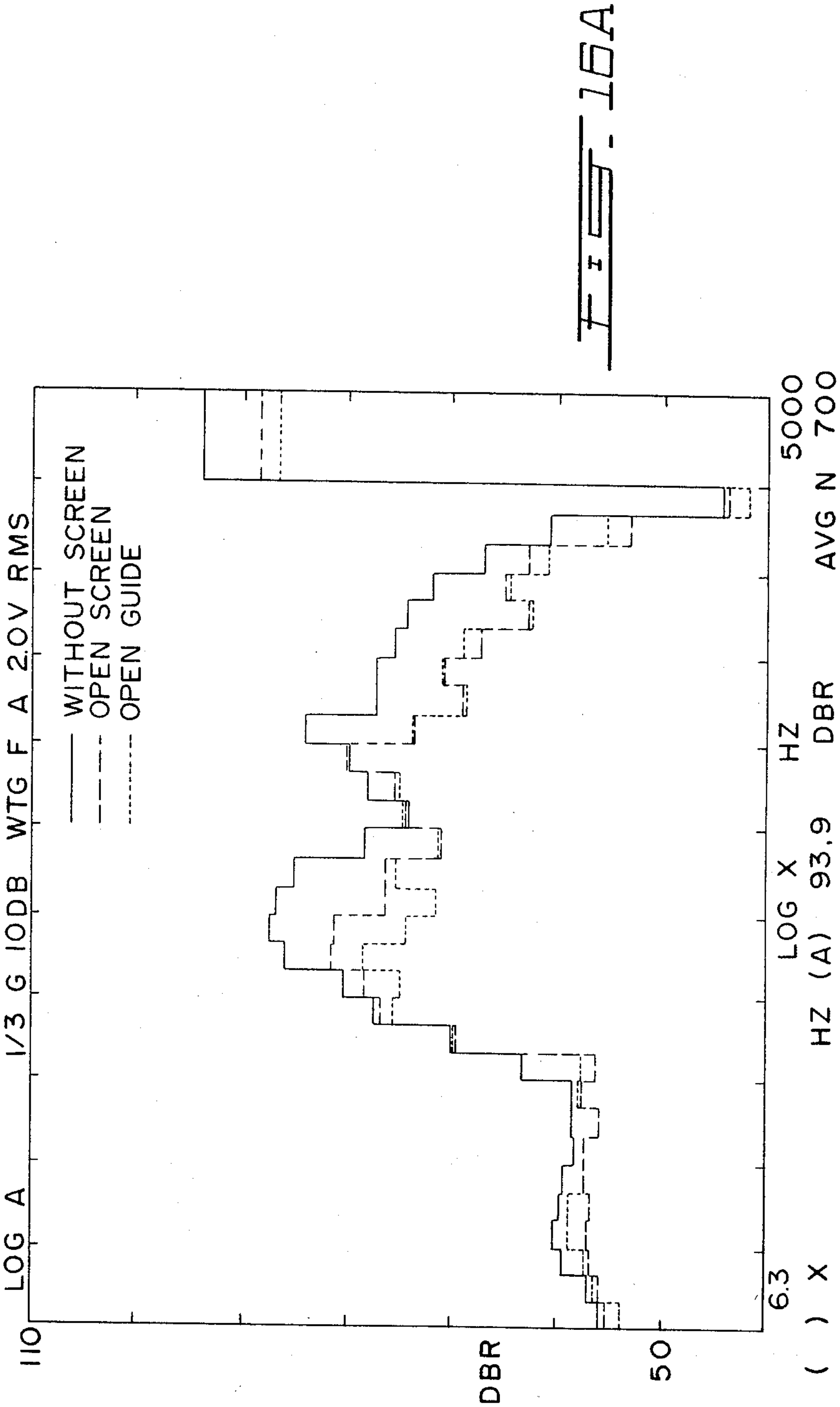

Having thus generally described the invention, reference will be made to the accompanying drawings in which:

FIG. 1 is a schematic representation of a sound reducing device in a prismatic form;

FIGS. 2A, B and C illustrate the method of testing the device of FIG. 1;

FIGS. 3A, B and C show the results obtained from testing the device of FIG. 1;

FIG. 4 is a schematic representation of a further noise-reducing device;

FIGS. 5A, B, C and D illustrate the testing procedure employed with the embodiment of FIG. 4;

FIGS. 6A, B, C, D, E and F illustrate the results obtained in testing the embodiment of FIG. 4;

FIG. 7 is a schematic representation of a further embodiment of a noise-reducing device;

FIGS. 8A, B, C and D illustrate the results of the testing of the device of FIG. 7;

FIG. 9 is a schematic representation of a further embodiment of a noise-reducing device;

FIGS. 10A, B, C and D illustrate the results of the testing of the embodiment of FIG. 9;

FIG. 11 is a schematic representation of a further embodiment of a noise-reducing device;

FIGS. 12A, B, C and D illustrate the test results of the embodiment of FIG. 11;

FIG. 13 is a schematic representation of a further embodiment of a noise-reducing device;

FIGS. 14A, B, C and D illustrate the test results of the device of FIG. 13;

FIG. 15 is a schematic representation of a further embodiment and the testing site therefor;

FIGS. 16A, B, C and D illustrate graphically the test results of the embodiment of FIG. 15; and FIG. 17 is a schematic representation of a further embodiment of a noise-reducing device.

Referring to FIG. 1, the noise-reducing device 10 illustrated therein has an overall prismatic shape with a plurality of elements 12 arranged so as to define a plurality of passageways 14 and ducts 16. Elements 12, which together define the body, are narrow plate-like members formed of any suitable material. A top member 18 and a base member 20 define passageways 14′, 14″ at the top and bottom of the device respectively. Each element 12 of device 10 has a height of 50.8 cms.; elements 12 are spaced apart from each other in both directions by a distance of 19.05 cms. thus forming ducts 16 and passageways 14 of this width. Passageways 14′ and 14″ have a width of 9.53 cms.—i.e. one-half of the width of the other passageways. The overall height of device 10 is 350 cms. with a width at the base of 210 cms. As will be noted from FIG. 1, there are five rows of elements with the uppermost row having four elements increasing arithmetically by two each row.

The method of testing the device of FIG. 1 is shown in FIGS. 2A, B and C. Thus as shown in FIG. 2A, device 10 is placed on a pedestal generally designated by reference numeral 22. Pedestal 22 is mounted on a support member 24 which is surrounded by sound-insulating material 26. Sound-insulating material 26 is also placed along the ground level. A source of sound is provided to the left of the noise-reducing device 10. Measurements are then taken at a plurality of points such as points A′ and B′.

Figure 2B:
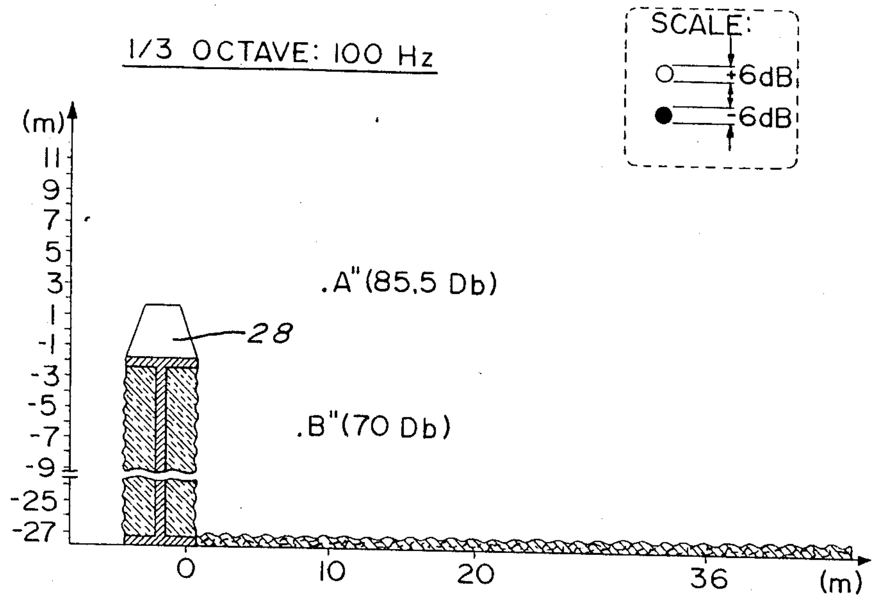

FIG. 2B illustrates measurements which are taken for comparative purposes utilizing a solid barrier 28 of the same dimensions as device 10. Readings are taken at points A″ and B″.

Figure 2C:
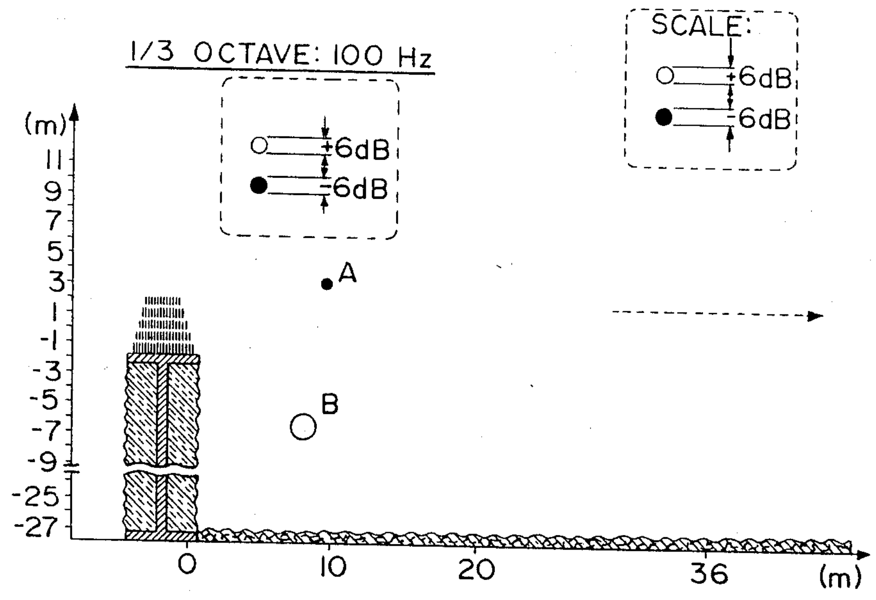

FIG. 2C illustrates the differences in readings between those obtained in FIGS. 2A and 2B. For the figures, a solid circle indicates a positive result for the noise-reducing device of FIG. 2A—i.e. in the illustrated example, reading A″ was 85.5 dB and A′ was 81.5 dB for a difference of 4 dB improvement utilizing the device of FIG. 2A as compared to a solid barrier. This is thus represented as a solid circle. At point B, B″ was 70 dB while B′ was 78 dB for an increase in the noise level at point B which is represented by a plain circle. In both instances, the diamter of the circle is proportional to the noise reduction and/or increase.

FIGS. 3A, B and C illustrate the results achieved utilizing device 10 compared to solid barrier 28 at sound frequencies of 100, 125 and 200 Hz respectively. In FIGS. 3A, B and C, line 30 represents the extent of the shadow cast by device 10. Above line 30, one can visually "see" the noise while any point below line 30 is in the "shadow" of device 10 or barrier 28 as the case may be.

As may be seen from FIGS. 3A, B and C, some sound reduction effect is obtained using device 10. However, in the area adjacent device 10 and in the shadow thereof, there is an increase in noise level when using the device compared to a solid barrier. This increase in noise level is believed to be the result of refraction of the sound waves passing through the passageways 14. The angle of deviation will depend on the frequency of the sound; the angle increasing as the frequency increases.

FIG. 4 is a schematic illustration of a further embodiment of a noise-reducing device which was tested. In FIG. 4, device 40 is of a rectangular configuration having the same overall dimensions (210×350 cm) as device 10. However, there are provided five rows of elements 12 each having twelve elements therein. This gives four passageways 14 having a widthof 19.05 cms. with the top and bottom passageways 14′, 14″ having a width of 9.53 cms., the same as for device 10. The elements 12 are of the same dimensions as device 10 and the width of the ducts is the same.

Figure 5B:
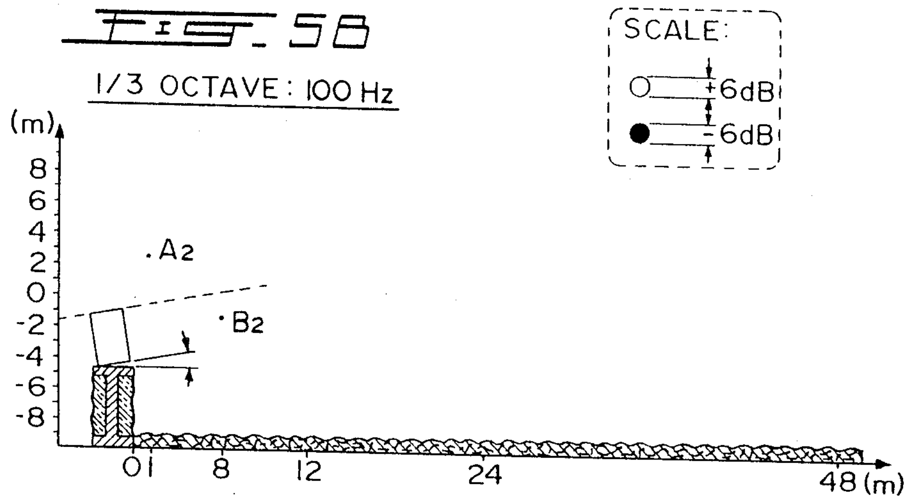

FIGS. 5A, B, C and D indicate the method of measuring employed for this series of tests. As shown in FIG. 5A, measurements of the sound level are taken at points $A_1$ and $B_1$ which will be assumed to be 78.1 dB and and 70.5 dB respectively. As shown in FIG. 5B, measurements are taken at points $A_2$ and $B_2$ when a solid barrier 28 is placed on pedestal 22. For purposes of this example, one assumes the noise measurements at points $A_2$ and $B_2$ as being 75 and 67.4 dB respectively.

Figure 5C:
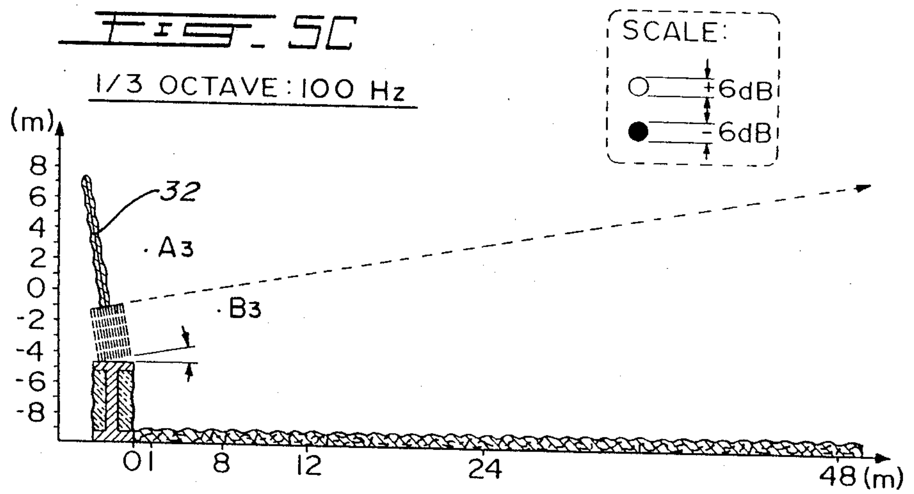

As shown in FIG. 5C, further noise measurements are then taken at points $A_3$ and $B_3$ when utilizing device 40 with a baffle or screen 32 mounted thereupon. For purposes of this example, one assumes the measurements at A to be 60 dB and B to be 74.8 dB.

In the above method of testing, at point $A_1$ in FIG. 5A, the sound measurement reflects the contribution of the direct sound waves, diffracted sound waves, and those sound waves transmitted through the passageways 14. A point $A_2$, the total sound measurement is a function of the direct sound waves and diffracted sound waves. At point $A_3$, the noise measurement is a result of the sound waves transmitted through the device.

At point $B_1$, the noise measurement is a combination of the diffracted sound waves and the transmitted sound waves or those passing through the device. At point $B_2$, one obtains a measurement only of the diffracted sound waves while at point $B_3$ one obtains a measurement of the sound waves passing through the device.

Figure 5D:
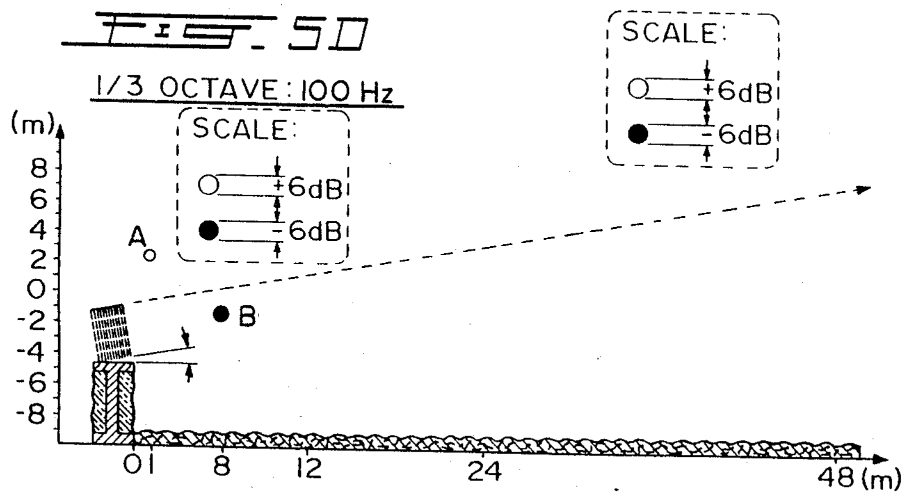

In the above example, and utilizing the given figures, one may calculate the final results which are then illustrated in FIG. 5D in accordance with the manner adopted for the previous examples (use of circles corresponding to the dB increase or decrease). Thus, taking point A, one would take the sum of $A_2$ and $A_3$ which would be 75.1 dB and subtract this total from the measurement at point $A_1$ in FIG. 5A to give the result of 3.0 dB. This represents the attenuation due to the phase lag of the sound wave, between the sound waves diffracted and those transmitted directly. Similarly, the readings at point B are calculated in a manner such that $B_2$ and $B_3$ are a total which would be equal to 75.5 dB. The difference between the sound level of point $B_1$ of 70.5 dB then gives a net sound reduction effect of 5 dB due to the phase lag of the sound waves passing through the device.

Referring to FIGS. 6A, B, C, D, E and F, the results are portrayed for levels of 50, 80, 100, 125, 200 and 1000 Hz respectively. As will be seen from these Figures, the sound reduction ahcieved, particularly at the lower frequencies for which the device is "tuned" is significant. In particular, one is able to achieve substantial sound reduction even when one can "see" the sound as is clearly illustrated in FIGS. 6A, B and C. Moreover, the zone below line 30 which is in the "shadow" of the device gives good results both close to the device and as one goes further away from the device.

FIG. 7 illustrates a further model of a sound-reducing device 42. Device 42 has a plate height of 50.8 cm, a top dimension of 210 cms., an overall height of 350 cms., duct and passageway widths of 19.05 cms except for passageways 14, 14′ formed adjacent top 18 and base 20 which are 9.53 cms. The number of plates varies arithmetically from 12 to 20. There are three full passageways 14 along with top and bottom passageways 14′, 14″.

Figure 3B:
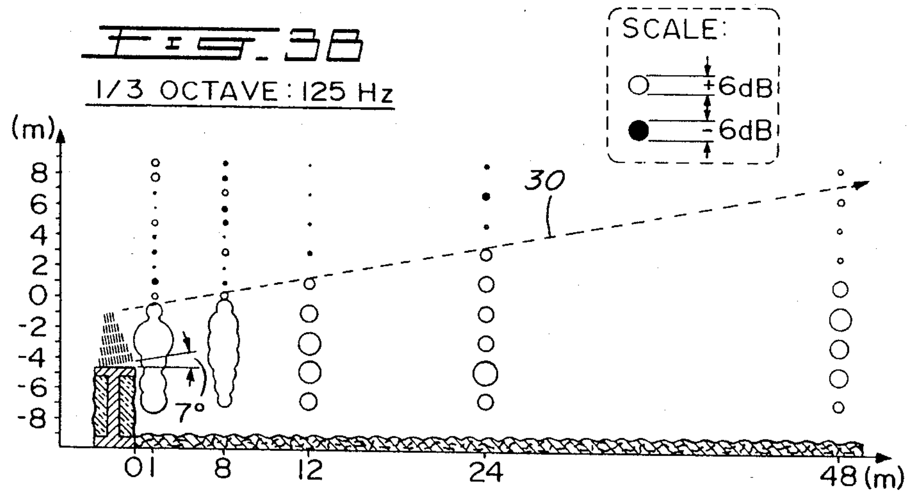
Figure 3C:
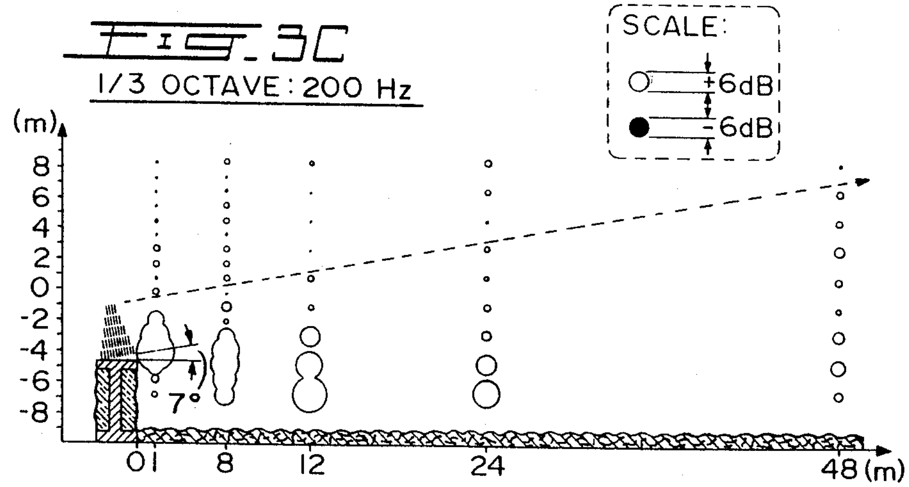

FIGS. 8A, B, C and D provide the results from testing the device 42 according to the test procedures employed for the embodiment of FIG. 3—i.e. as shown in FIGS. 2A, B and C. In other words, the test results show the increase or decrease in the sound level when comparing device 42 to a solid barrier of the same dimensions. As may be seen from the Figures, in the zone in the shadow of device 42, due to the refraction of the waves, device 42 generally gives results inferior to those of a solid device. There is some improvement adjacent the line defining the shadow zone and that zone where one can see the noise source.

In the embodiment of FIG. 9, two rows of elements are utilized with the uppermost row having twelve elements and the lower row having fourteen, thus providing a single central passageway 14 having a width of 19.05 cms and upper and lower passageways 14′, 14″ of 9.53 cms. Each plate member is again 50.8 cms. in height and the height of the device is 140 cms. with a top width of 210 cms. However, the device is mounted on a solid base to provide an overall height of 350 cms. and and overall base with 400 cms.

FIGS. 10A, B, C and D give the tests results according to the techniques employed in the embodiment of FIG. 2—the results indicate the noise difference between device 44 and a solid barrier of equal dimensions. As will be noted, device 44 is superior to a solid barrier at the lower frequencies while still providing the advantages of a ducted device.

FIG. 11 illustrates a further embodiment of a noise reducing device 46 wherein a single central passageway 14 is provided. In this embodiment, fourteen upper plates are provided and sixteen lower plates with a duct width 16 of 19.05 cms. The height of the plates is 25.40 cms. while the width of the passageway 14 is 12.70 cms. The width of the passageways 14′, 14″ at top 18 and base 20 respectively is 6.35 cms. The overall width of device 46 adjacent top 18 is 248 cms. with the overall height being 76 cms. Device 46 is set on a solid base 47 so that the overall width of the apparatus is 552 cms. and the overall height is 292 cms.

FIGS. 12A, B, C and D illustrate the results achieved in the testing of device 46 at frequencies of 100, 160, 200 and 500 Hz. The device is designed to have a phase lag of 180° at 160 Hz. The method of testing is that employed of FIG. 2 and as will be seen, there is again a reduction in the noise when compared to the solid barrier.

FIG. 13 illustrates a further embodiment of a noise-reducing device 48 similar to the device of FIG. 11. There are provided three rows of plates, containing from top to bottom, fourteen, sixteen and eighteen elements. Each plate has a height of 25.4 cms.; a duct 16 width of 19.05 cms.; a passageway 14 width of 12.70 cms. while ducts 14′ and 14″ have widths of 6.35 cms. The overall height of the device is 114 cms.; the upper width being 248 cms.; the device being set on a base to have an overall height of 292 cms. and an overall base of 552 cms.

The results of the testing of device 48 are illustrated in FIGS. 14A, B, C and D. As will be seen from these figures, a noise reduction effect is obtained utilizing device 48; and increased noise level occurs close to the device and at points below the level of the device.

Turning to FIG. 15, the set up of a device 60 and the testing of the same is illustrated. Device 60 has a pair of passageways 14 and a bottom passageway 14″. D represents the distance and H the height of a microphone 64. 62 is the noise generator.

Figure 16B:
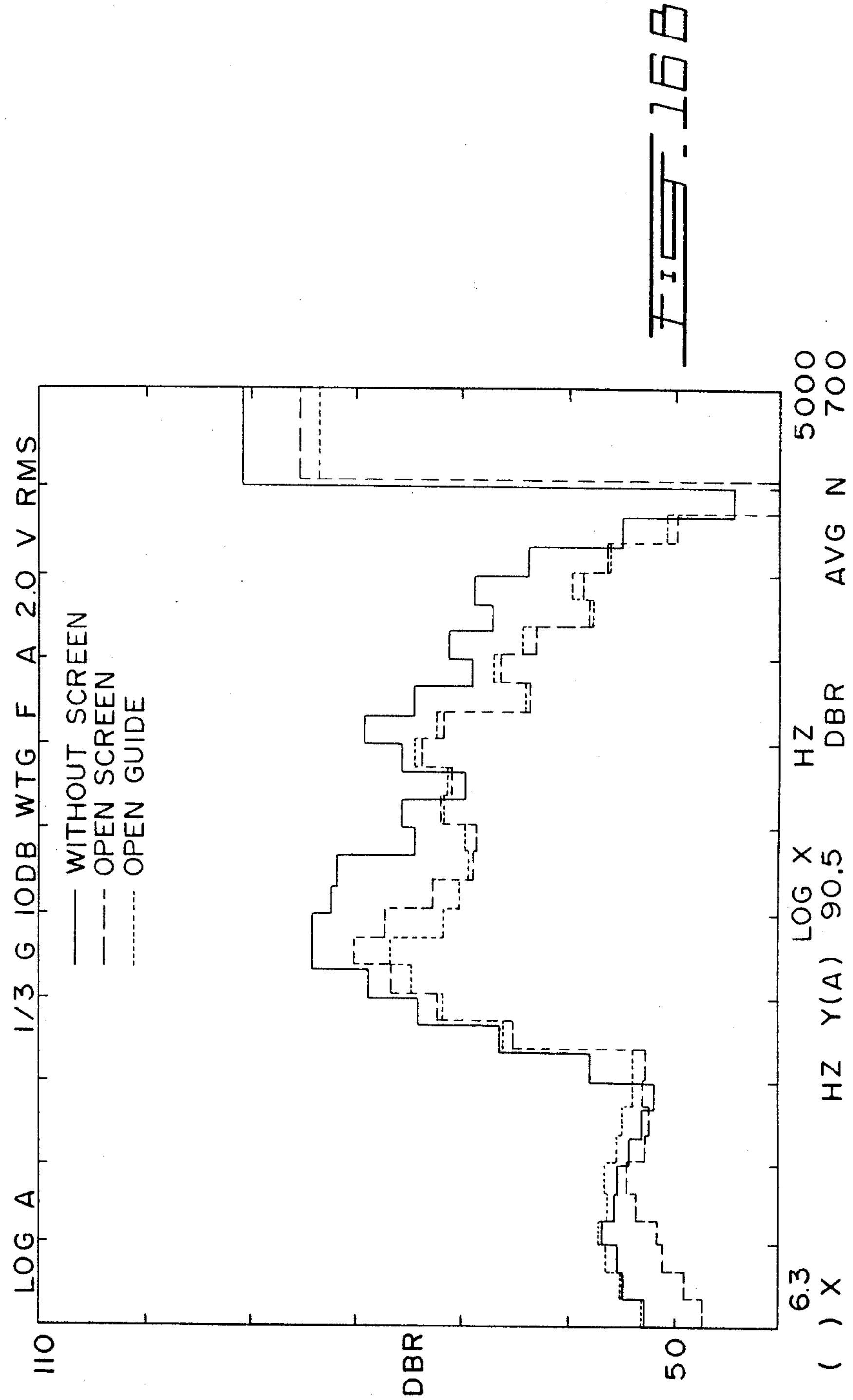
Figure 16C:
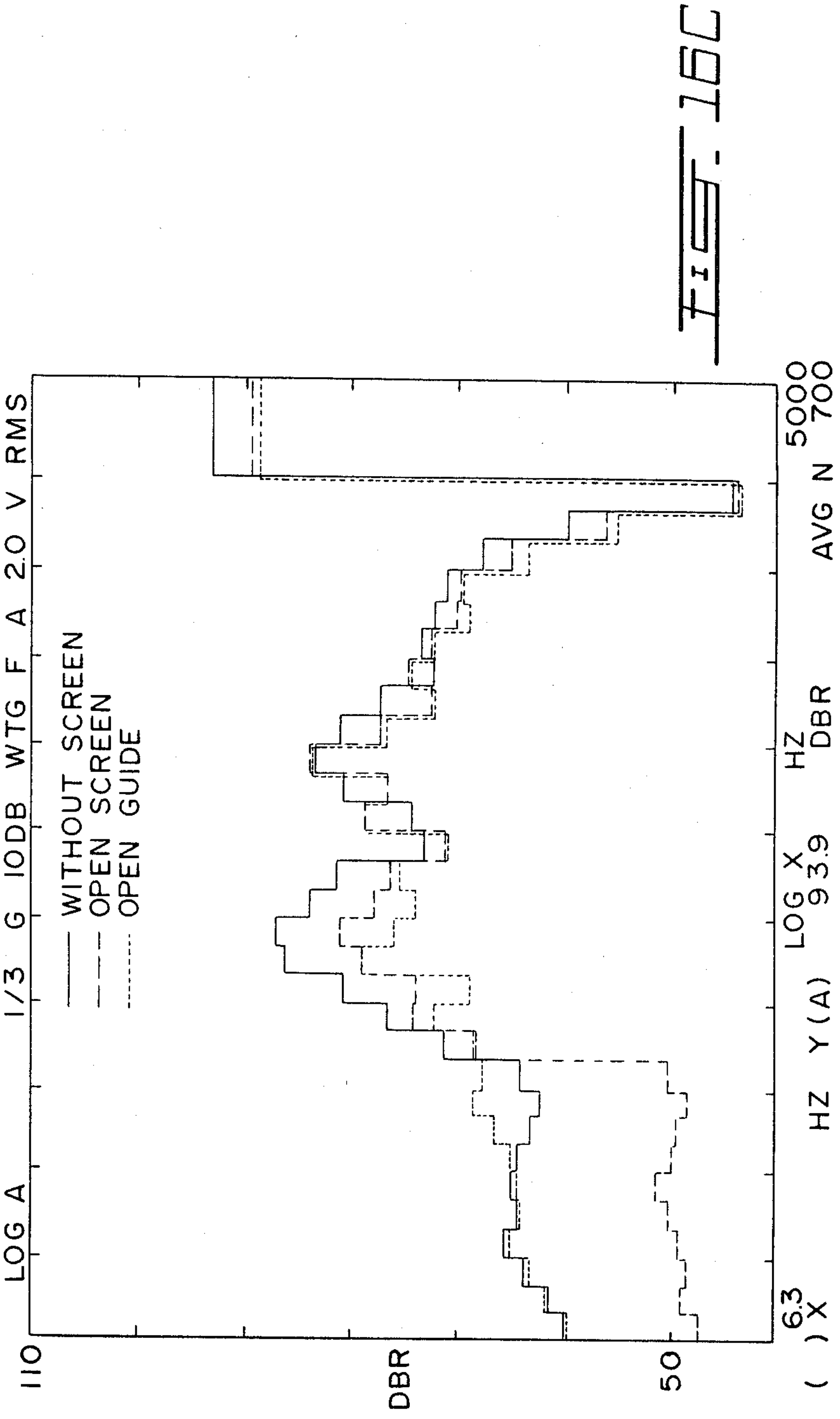
Figure 16D:
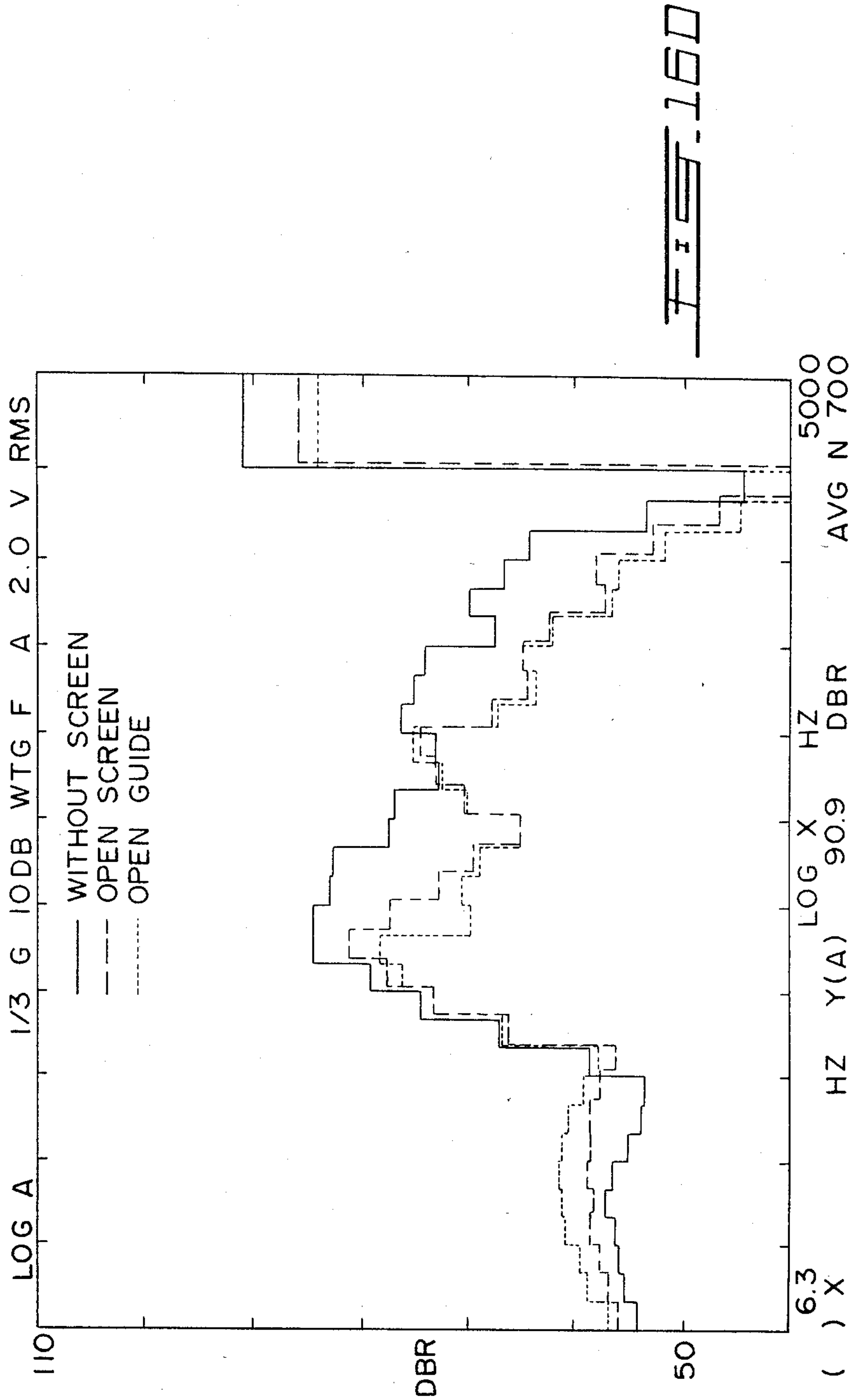

FIGS. 16A and 16B give the noise measurement at a height of 3 meters above the ground and at distances of 10 and 20 meters respectively. FIGS. 16C and 16D give the noise measurements at a height of 4 meters and distances of 10 and 20 meters respectively. The horizontal axis is the log of the frequency in hertz and the vertical axis is in dB. Measurements were taken without device 60; utilizing device 60 with passageways 14 and 14″ being open and finally with only the lower passageway 14 being open.

As will be seen from the measurements, even at heights above the height of the screen, a substantial noise reduction effect can be obtained. Furthermore, it is evident that the device can be tuned using a single passageway or guide to reduce noise level at a certain frequency. The invention also enables one to use a "dipole" approach for noise reduction. One dipole could be situated close to the ground while the second one spaced a distance therefrom.

FIG. 17 illustrates a further embodiment of a noise-reducing device having the dimensions given on the drawings. The device is "tuned" to have maximum performance in the ⅓ octave band of noise centered on 100 Hz and Tables 1 to 10 give the results when the device was tested in the ⅓ of octave bands with center frequencies respectively 50, 63, 80, 100, 125, 160, 200, 400, 800 and 1600 Hz. The device was placed at ground level and the source of noise approached at forty meters from the left-hand side of the device. The distances at which the measurements were taken including both the horizontal and height are in meters. A plus figure represents the lowering of the sound measurement as compared to a solid barrier of identical configuration. A minus figure represents a higher noise level with the device of FIG. 17 vis-a-vis a solid barrier.

TABLE 1

| | Dist. | | | | | | | |
|---|---|---|---|---|---|---|---|---|
| Height | 5.0 | 7.9 | 12.6 | 19.9 | 31.5 | 50.0 | 79.2 | 125.6 |
| 1.2 | −3.6 | 0.1 | −1.8 | −0.4 | −0.1 | −2.7 | 1.0 | −2.2 |
| 1.3 | −3.1 | −1.6 | −4.0 | 0.4 | 0.2 | −2.5 | 4.1 | 0.6 |
| 2.4 | −1.8 | −3.1 | −2.6 | −2.6 | −0.7 | 0.4 | −0.8 | 0.1 |
| 3.0 | −2.2 | −4.8 | −3.8 | −1.0 | −4.4 | 0.1 | −3.1 | 1.1 |
| 3.6 | −1.3 | −2.7 | −3.3 | −1.6 | −1.1 | −0.1 | −1.0 | −0.9 |
| 4.2 | 2.6 | −2.8 | −2.3 | 2.9 | −0.3 | −3.3 | −1.0 | 1.5 |
| 4.8 | 3.9 | 0.2 | −0.1 | 1.1 | −0.8 | −0.3 | −0.2 | −0.4 |
| 5.4 | 3.4 | 2.1 | 0.3 | −1.8 | −2.4 | 2.6 | 0.5 | −1.7 |
| 6.0 | 3.6 | 2.7 | 0.2 | −0.4 | −2.7 | −1.0 | −0.4 | −2.4 |
| 6.6 | 4.3 | 2.3 | 0.0 | 2.4 | −0.5 | −0.6 | −1.3 | −0.9 |
| 7.2 | 2.7 | 5.8 | 1.8 | −2.8 | −0.4 | −0.1 | 0.3 | −1.3 |
| 7.8 | 2.7 | 1.5 | 0.7 | 2.9 | −2.1 | −3.0 | −1.2 | −0.2 |
| 8.4 | 3.3 | 3.1 | 3.0 | 1.4 | −3.3 | −1.7 | 0.4 | 1.3 |
| 9.0 | 1.9 | 2.9 | 3.3 | 4.0 | −1.9 | −0.4 | −1.1 | 0.3 |
| 9.6 | 2.4 | 2.7 | 2.2 | 3.2 | 0.2 | −1.8 | −0.9 | −0.8 |
| 10.2 | 2.5 | 3.5 | 3.3 | 4.6 | −0.6 | −1.5 | 0.0 | −1.0 |
| 10.8 | 0.1 | 3.4 | 2.8 | 3.4 | 2.2 | −1.6 | −0.5 | 0.1 |
| 11.4 | −0.2 | 0.4 | 2.4 | 4.2 | 1.7 | −1.2 | −1.4 | −1.5 |
| 12.0 | 1.3 | 2.6 | 0.4 | 1.9 | 3.5 | −1.2 | −1.0 | −1.8 |
| 12.6 | 2.2 | 1.2 | 1.1 | 3.3 | 2.3 | −0.4 | −1.7 | −1.4 |
| 13.2 | 1.9 | 1.0 | 2.1 | 2.0 | 0.6 | −1.9 | −0.8 | −1.0 |
| 13.8 | −0.3 | 1.5 | 1.4 | 2.5 | 2.0 | −0.1 | 0.7 | −0.5 |
| 14.4 | 1.8 | 1.3 | 1.4 | 2.8 | 5.1 | −1.6 | 2.6 | −1.6 |
| 15.0 | 2.2 | 0.6 | 1.4 | 2.2 | 1.0 | 0.7 | −1.6 | 0.2 |
| 15.6 | −0.8 | 0.8 | 0.6 | 1.7 | 2.3 | 1.3 | −1.1 | −0.3 |
| 16.2 | 3.3 | 0.7 | 0.5 | 2.4 | 2.7 | −1.2 | −0.3 | −0.8 |
| 16.8 | 1.5 | 1.8 | −1.3 | 3.6 | 2.1 | 3.6 | −1.0 | 0.4 |
| 17.4 | 1.0 | 0.2 | 1.1 | 1.5 | 4.3 | 0.9 | 0.2 | 0.6 |
| 18.0 | 2.6 | 4.6 | 1.0 | 3.2 | 3.8 | 0.9 | −1.5 | −1.6 |
| 18.6 | 0.9 | 2.3 | −0.3 | 0.1 | 2.8 | −1.3 | −0.3 | −0.7 |
| 19.2 | 2.2 | 2.4 | 0.2 | −1.0 | 3.9 | 2.9 | −0.4 | −3.3 |
| 19.8 | 2.1 | 3.2 | −0.8 | 1.0 | 3.9 | 1.8 | −0.5 | −0.2 |

TABLE 2

| | Dist. | | | | | | | |
|---|---|---|---|---|---|---|---|---|
| Height | 5.0 | 7.9 | 12.6 | 19.9 | 31.5 | 50.0 | 79.2 | 125.6 |
| 1.2 | −3.5 | −1.7 | −1.5 | −0.3 | 0.6 | 0.9 | 0.8 | 1.4 |
| 1.8 | −2.1 | −2.1 | −2.2 | −0.2 | 0.1 | −1.6 | 0.0 | 0.5 |
| 2.4 | −2.2 | −1.0 | −0.4 | 0.1 | −0.4 | 0.1 | −0.1 | 1.1 |
| 3.0 | 1.8 | −1.2 | −1.3 | −2.3 | 0.6 | −3.1 | −0.2 | −0.6 |
| 3.6 | 5.0 | 3.6 | −0.1 | 0.3 | 0.1 | −0.5 | −0.2 | 1.9 |
| 4.2 | 5.1 | 4.8 | −1.9 | 0.2 | −0.3 | −0.9 | 0.1 | 0.3 |
| 4.8 | 4.0 | 4.8 | 1.1 | −1.1 | 1.2 | 0.1 | 0.1 | −0.7 |
| 5.4 | 0.4 | 4.4 | 2.7 | 1.8 | 0.5 | −0.9 | −0.6 | 0.0 |
| 8.0 | 2.4 | 2.6 | 1.2 | 0.2 | 2.2 | 1.0 | 3.1 | 0.6 |
| 6.6 | 2.3 | 1.9 | 2.6 | 1.6 | 1.3 | −0.2 | −0.8 | −0.1 |
| 7.2 | 0.4 | 0.4 | 2.1 | 2.7 | 0.5 | 1.6 | 0.9 | 0.4 |
| 7.8 | −1.2 | −0.3 | 2.7 | 3.6 | 1.7 | 1.6 | 0.8 | 1.4 |
| 8.4 | −0.3 | 0.1 | 2.6 | 2.8 | 2.0 | 0.2 | −0.3 | 0.3 |
| 9.0 | −0.1 | 2.4 | 0.6 | 3.7 | 2.3 | 3.5 | 1.0 | 0.6 |

TABLE 2-continued

| | Dist. | | | | | | | |
|---|---|---|---|---|---|---|---|---|
| Height | 5.0 | 7.9 | 12.6 | 19.9 | 31.5 | 50.0 | 79.2 | 125.6 |
| 9.6 | 0.4 | 1.3 | −0.2 | 3.3 | 3.1 | −2.1 | 0.3 | 0.2 |
| 10.2 | −0.4 | −1.5 | 1.7 | 3.2 | 1.0 | 0.4 | 1.5 | −0.5 |
| 10.8 | 0.4 | −1.1 | −0.6 | 1.1 | 5.1 | 1.8 | −0.8 | 1.9 |
| 11.4 | 0.4 | −0.8 | 0.0 | 1.2 | 3.3 | 1.9 | 1.5 | −1.3 |
| 12.0 | 1.2 | −1.1 | −0.4 | −0.2 | 2.8 | 2.5 | −0.3 | 1.7 |
| 12.6 | 1.7 | 2.3 | −0.2 | 2.6 | 3.7 | 1.4 | 1.7 | 1.0 |
| 13.2 | 2.4 | −0.4 | −0.5 | 0.3 | 3.1 | 1.8 | 0.1 | −0.3 |
| 13.8 | 0.7 | 0.5 | −1.6 | 1.5 | 4.7 | 2.6 | 0.0 | −0.1 |
| 14.4 | 1.2 | 2.7 | −0.1 | 1.3 | 3.2 | 3.5 | 1.6 | 1.5 |
| 15.0 | 2.9 | 2.0 | 0.3 | −0.5 | 3.0 | 3.2 | 2.2 | 1.1 |
| 15.6 | 0.9 | 3.2 | 0.2 | 1.1 | 1.4 | 1.5 | 0.5 | 0.0 |
| 16.2 | 0.9 | 3.4 | −0.1 | 0.7 | 3.3 | 2.0 | 1.5 | 2.8 |
| 16.8 | 1.0 | 1.2 | 0.9 | 0.6 | 0.0 | 3.4 | 1.2 | 1.7 |
| 17.4 | 1.2 | 0.9 | −0.1 | 1.6 | 0.0 | 2.1 | 2.6 | 0.4 |
| 18.0 | 2.4 | 2.3 | 1.4 | 0.0 | 1.8 | 4.5 | 2.9 | 1.4 |
| 18.6 | 0.4 | 2.5 | 1.5 | 0.2 | 1.2 | 2.6 | 0.8 | 1.0 |
| 19.2 | 1.0 | 1.4 | 0.8 | 0.8 | −0.8 | 2.5 | 2.2 | −2.1 |
| 19.8 | 1.1 | 0.9 | 3.0 | 1.2 | 1.6 | 1.4 | 1.4 | 0.9 |

TABLE 3

| | Dist. | | | | | | | |
|---|---|---|---|---|---|---|---|---|
| Height | 5.0 | 7.9 | 12.6 | 19.9 | 31.5 | 50.0 | 79.2 | 125.6 |
| 1.2 | −2.3 | −0.5 | 1.4 | 1.5 | 1.0 | 0.9 | 1.6 | 3.2 |
| 1.8 | −1.6 | 0.2 | 0.4 | 0.6 | 0.9 | 1.1 | 0.1 | 1.2 |
| 2.4 | 3.1 | 2.3 | −0.1 | 0.2 | −0.3 | 0.4 | 0.7 | 2.4 |
| 3.0 | 3.3 | 4.1 | 1.7 | 1.4 | 1.2 | 0.8 | 0.7 | 1.4 |
| 3.6 | 3.3 | 4.4 | 2.0 | 1.4 | 0.7 | 2.3 | 1.9 | 2.8 |
| 4.2 | 0.6 | 2.7 | 3.6 | 1.9 | 1.0 | 0.7 | 1.2 | 2.0 |
| 4.8 | 2.5 | 1.3 | 3.4 | 3.6 | 0.7 | 0.6 | 2.2 | 0.9 |
| 5.4 | 1.1 | −0.5 | 2.0 | 3.1 | 1.0 | 1.9 | 1.6 | 1.0 |
| 6.0 | 1.2 | 0.2 | 0.7 | 3.9 | 3.6 | 0.7 | 4.0 | 1.1 |
| 6.6 | −0.7 | 0.1 | 1.1 | 2.1 | 2.7 | 2.0 | 0.6 | 1.1 |
| 7.2 | −0.5 | −0.4 | 2.0 | 3.3 | 4.1 | 0.1 | 2.0 | 0.8 |
| 7.8 | −1.3 | −0.3 | 0.8 | 0.8 | 1.9 | 1.9 | 1.9 | 0.8 |
| 8.4 | 1.7 | 0.9 | 0.0 | 1.4 | 4.1 | 3.3 | 0.6 | 1.0 |
| 9.0 | 1.2 | 2.1 | 0.8 | −0.2 | 2.4 | 1.7 | 3.1 | 2.2 |
| 9.6 | 3.6 | 0.0 | −0.4 | 0.5 | 1.5 | 2.6 | 2.1 | 0.3 |
| 10.2 | 2.9 | 2.1 | 1.2 | −0.2 | 2.5 | 1.6 | 2.1 | 0.6 |
| 10.8 | 2.8 | 2.6 | 0.4 | 1.0 | 2.3 | 1.5 | 0.3 | 2.3 |
| 11.4 | 3.0 | 2.6 | 1.1 | 0.0 | 2.8 | 3.4 | 1.3 | 1.6 |
| 12.0 | 2.2 | 3.6 | −1.0 | −1.0 | 0.7 | 2.8 | 1.8 | 0.9 |
| 12.6 | 1.2 | 4.4 | 0.6 | −0.6 | 0.7 | 2.5 | 2.2 | 0.7 |
| 13.2 | 1.0 | 1.7 | 0.2 | 0.8 | 1.6 | 2.5 | 3.7 | 0.4 |
| 13.8 | 1.0 | 1.9 | 1.8 | 1.3 | 1.6 | 1.3 | 3.3 | 1.5 |
| 14.4 | 2.1 | 1.5 | 4.0 | 0.2 | 0.7 | 1.8 | 3.0 | 2.1 |
| 15.0 | −0.2 | 2.8 | 1.0 | 0.0 | 1.0 | 1.3 | 2.9 | 1.6 |
| 15.6 | 1.2 | 0.8 | 1.8 | −0.3 | 0.8 | 3.7 | 2.0 | 1.9 |
| 16.2 | 1.9 | 1.6 | 2.1 | −0.1 | 0.1 | 1.2 | 1.5 | 3.4 |
| 16.8 | 1.2 | 2.0 | 1.9 | 0.7 | 0.2 | 1.2 | 2.4 | 1.3 |
| 17.4 | 3.0 | 0.4 | 1.4 | 1.0 | 1.8 | 1.6 | 2.1 | 1.9 |
| 18.0 | 2.5 | 2.1 | 1.7 | 2.4 | 0.1 | 1.5 | 0.8 | 3.0 |
| 18.6 | 2.8 | 1.4 | −0.2 | 1.5 | 0.0 | 3.6 | 3.3 | 1.2 |
| 19.2 | 1.4 | 2.2 | −0.8 | 2.9 | 0.9 | 1.1 | 2.9 | 1.4 |
| 19.8 | 1.8 | 1.4 | 0.8 | 2.7 | −0.4 | −0.6 | 4.9 | 2.1 |

TABLE 4

| | Dist. | | | | | | | |
|---|---|---|---|---|---|---|---|---|
| Height | 5.0 | 7.9 | 12.6 | 19.9 | 31.5 | 50.0 | 79.2 | 125.6 |
| 1.2 | −3.7 | 1.0 | 5.0 | 3.7 | 3.5 | 4.4 | 2.4 | 3.2 |
| 1.8 | 1.0 | 2.4 | 4.2 | 3.1 | 2.8 | 3.1 | 4.1 | 1.8 |
| 2.4 | 0.8 | 1.8 | 4.2 | 3.2 | 4.8 | 3.2 | 2.1 | 3.8 |
| 3.0 | 2.1 | 1.3 | 1.7 | 4.2 | 5.1 | 4.7 | 4.6 | 2.8 |
| 3.6 | 0.8 | 0.5 | 1.8 | 3.2 | 3.9 | 3.2 | 3.6 | 1.9 |
| 4.2 | 0.2 | 0.1 | 0.1 | 2.3 | 5.0 | 4.1 | 3.0 | 2.5 |
| 4.8 | 0.3 | 1.9 | 0.0 | 0.2 | 4.8 | 4.4 | 4.1 | 2.9 |
| 5.4 | 0.0 | 1.3 | 2.4 | −0.2 | 3.0 | 3.3 | 3.0 | 2.6 |
| 6.0 | 1.4 | −0.3 | 1.5 | 0.9 | 2.3 | 3.1 | 2.7 | 2.5 |
| 6.6 | 1.6 | 0.8 | −0.4 | 0.5 | 2.3 | 4.2 | 2.7 | 2.0 |
| 7.2 | 1.3 | 0.5 | 1.2 | 1.5 | 0.9 | 2.9 | 3.0 | 2.2 |
| 7.8 | 3.7 | 1.4 | 0.3 | 1.8 | 0.1 | 3.4 | 2.9 | 2.3 |
| 8.4 | 2.0 | 1.0 | 1.5 | 0.4 | 1.5 | 2.3 | 3.0 | 2.9 |
| 9.0 | 3.0 | 4.3 | 1.5 | −0.2 | 1.5 | 3.9 | 3.3 | 3.6 |
| 9.6 | 1.4 | 0.8 | 1.4 | 0.8 | −0.1 | 1.9 | 2.5 | 4.5 |
| 10.2 | 0.5 | 3.2 | 0.5 | −0.2 | 1.9 | 1.3 | 3.4 | 3.0 |

TABLE 4-continued

| Height | Dist. 5.0 | 7.9 | 12.6 | 19.9 | 31.5 | 50.0 | 79.2 | 125.6 |
|---|---|---|---|---|---|---|---|---|
| 10.8 | 0.3 | 0.6 | 1.5 | 0.5 | −0.5 | 0.7 | 3.3 | 3.4 |
| 11.4 | 2.1 | 1.8 | 4.1 | 1.4 | 1.0 | 1.6 | 3.9 | 3.8 |
| 12.0 | −1.0 | 3.2 | 1.9 | 1.6 | 0.2 | 0.5 | 3.5 | 2.6 |
| 12.6 | 2.8 | 0.6 | 3.2 | 0.4 | 0.3 | −0.3 | 0.6 | 2.2 |
| 13.2 | 1.7 | −0.3 | 2.6 | 1.6 | 2.9 | 0.2 | 1.1 | 2.2 |
| 13.8 | 3.0 | 0.0 | 2.6 | 2.8 | 1.7 | 1.7 | 1.8 | 1.4 |
| 14.4 | 2.2 | 1.5 | 2.4 | 3.3 | 1.2 | 0.2 | 3.6 | 1.4 |
| 15.0 | 1.0 | 0.9 | 0.3 | 0.8 | 1.5 | 1.2 | 1.0 | 2.1 |
| 15.6 | 1.5 | 3.8 | 1.0 | 2.4 | 1.2 | 0.2 | −0.2 | 2.0 |
| 16.2 | 0.8 | 2.6 | 0.5 | 0.4 | 2.8 | 0.7 | 1.3 | 3.3 |
| 16.8 | 2.2 | 2.2 | 2.3 | 3.5 | 0.7 | 1.8 | −0.2 | 2.7 |
| 17.4 | 1.5 | 2.8 | 1.0 | 3.4 | 1.1 | 1.0 | 1.2 | 2.6 |
| 18.0 | 0.9 | 1.1 | 2.0 | 0.7 | 2.2 | 1.1 | 1.8 | 2.2 |
| 18.6 | 1.4 | 1.4 | 1.4 | −0.4 | 0.3 | 0.5 | 1.0 | 3.1 |
| 19.2 | 3.2 | 1.5 | 2.1 | 1.7 | 1.8 | −0.2 | 1.2 | 1.7 |
| 19.8 | 2.5 | 1.6 | 1.5 | 1.1 | 1.4 | 0.9 | 0.7 | 2.5 |

TABLE 5

| Height | Dist. 5.0 | 7.9 | 12.6 | 19.9 | 31.5 | 50.0 | 79.2 | 125.6 |
|---|---|---|---|---|---|---|---|---|
| 1.2 | −1.9 | 1.9 | 2.1 | 1.9 | 3.5 | 2.7 | 1.6 | 2.3 |
| 1.8 | −1.6 | 0.1 | 2.1 | 1.7 | 2.8 | 2.0 | 2.7 | 1.3 |
| 2.4 | −0.8 | −2.2 | −0.2 | 0.2 | 3.8 | 2.5 | 2.8 | 1.6 |
| 3.0 | 1.0 | 0.2 | −1.1 | 0.3 | 2.0 | 2.4 | 2.6 | 3.5 |
| 3.6 | −0.2 | −0.6 | −2.8 | −1.5 | 1.4 | 1.9 | 2.1 | 0.2 |
| 4.2 | 0.4 | 0.8 | −0.5 | −0.6 | 1.3 | 2.0 | 1.5 | 2.0 |
| 4.8 | 0.8 | −1.5 | 0.0 | −0.5 | 0.5 | 1.3 | 2.3 | 3.4 |
| 5.4 | 0.3 | 0.7 | 0.4 | −0.6 | 1.8 | 1.2 | 2.7 | 2.6 |
| 6.0 | 0.7 | 1.5 | 1.6 | 1.2 | −0.1 | −0.2 | 2.0 | 2.9 |
| 6.6 | 0.9 | −0.6 | 1.3 | 0.0 | −0.8 | 0.9 | 1.4 | 2.7 |
| 7.2 | 2.1 | 1.2 | −1.2 | 0.0 | −0.1 | 1.0 | 1.6 | 1.8 |
| 7.8 | 2.8 | 0.8 | 0.4 | −0.8 | −0.6 | 0.7 | 2.5 | 2.4 |
| 8.4 | 2.5 | 2.3 | 0.3 | 1.0 | 0.2 | 0.4 | 1.3 | 1.4 |
| 9.0 | −0.2 | 0.9 | 2.0 | 0.2 | −1.3 | −1.1 | 1.6 | 2.2 |
| 9.6 | 0.7 | 1.8 | 2.5 | 1.4 | 1.0 | −0.8 | 1.5 | 3.6 |
| 10.2 | 0.8 | 3.3 | 1.9 | 2.9 | 1.0 | 0.0 | 0.0 | 2.4 |
| 10.8 | 1.2 | 2.3 | 2.2 | 0.9 | 1.2 | −0.2 | −0.1 | 1.5 |
| 11.4 | 1.5 | −0.3 | 4.3 | 0.1 | 0.1 | 1.0 | 0.6 | 1.3 |
| 12.0 | 2.4 | 2.0 | 1.1 | 0.4 | 1.0 | 0.2 | 1.4 | 2.8 |
| 12.6 | 3.4 | −0.2 | 1.8 | 0.8 | 1.2 | 0.2 | 1.0 | 2.3 |
| 13.2 | 1.4 | 0.9 | 3.0 | 1.1 | 2.3 | −0.3 | −0.3 | 1.7 |
| 13.8 | 1.5 | 1.5 | 1.3 | 1.7 | 0.0 | −1.5 | 1.2 | 2.4 |
| 14.4 | 1.2 | 2.4 | 0.4 | 1.7 | 0.8 | 0.2 | −0.2 | 1.6 |
| 15.0 | −0.2 | 2.0 | −0.2 | 0.6 | 2.6 | −0.6 | 0.6 | 1.0 |
| 15.6 | 0.0 | 2.0 | 0.7 | 1.8 | 1.7 | 0.7 | 0.9 | 0.3 |
| 16.2 | 0.6 | 1.4 | 1.2 | 0.9 | 1.5 | 0.7 | −0.2 | 1.0 |
| 16.8 | 2.4 | 1.5 | 1.6 | −0.2 | 0.7 | 2.4 | −1.0 | −0.2 |
| 17.4 | 2.2 | −0.6 | 1.2 | 1.8 | 0.8 | 1.9 | 0.7 | 0.4 |
| 18.0 | 2.7 | 0.9 | 2.2 | 1.0 | 1.6 | 1.6 | −0.2 | 0.3 |
| 18.6 | 2.5 | 0.2 | 3.4 | 1.7 | 2.2 | 0.9 | 0.5 | 0.1 |
| 19.2 | 1.1 | 1.1 | 2.5 | 1.0 | 1.2 | 1.8 | 1.3 | 0.1 |
| 19.8 | 0.3 | 1.6 | 2.0 | 0.8 | 0.2 | 1.0 | 0.1 | 1.5 |

TABLE 6

| Height | Dist. 5.0 | 7.9 | 12.6 | 19.9 | 31.5 | 50.0 | 79.2 | 125.6 |
|---|---|---|---|---|---|---|---|---|
| 1.2 | 0.1 | 1.3 | 0.3 | 1.7 | 1.4 | 1.3 | 0.9 | 1.4 |
| 1.8 | 1.1 | 0.6 | 1.1 | 0.7 | 0.8 | 2.5 | 2.2 | 2.4 |
| 2.4 | −0.2 | 0.4 | 1.3 | 1.6 | 2.1 | 1.4 | 1.0 | 2.4 |
| 3.0 | 1.3 | 1.2 | 0.3 | 0.7 | 0.4 | 2.3 | 2.7 | 2.8 |
| 3.6 | 1.5 | 1.6 | 0.0 | 0.5 | 2.2 | 1.4 | 1.0 | 2.4 |
| 4.2 | 1.3 | 2.3 | 0.8 | 1.5 | 1.3 | 1.3 | 0.9 | 1.2 |
| 4.8 | 0.9 | 0.6 | −0.1 | 1.8 | 1.8 | 1.6 | 1.4 | 1.9 |
| 5.4 | 2.9 | 0.9 | 1.2 | 1.0 | 0.0 | 1.2 | 1.9 | 2.5 |
| 6.0 | 1.9 | 1.1 | 0.4 | 1.3 | 1.6 | −0.2 | 0.8 | 1.4 |
| 6.6 | 2.3 | 1.7 | 0.6 | 0.2 | −0.1 | 1.0 | 3.0 | 0.9 |
| 7.2 | 1.8 | 1.3 | 0.4 | 0.7 | 2.1 | 0.8 | 2.3 | 1.1 |
| 7.8 | 1.4 | 1.3 | 1.3 | 0.8 | 2.1 | 1.8 | 1.9 | 1.4 |
| 8.4 | 0.6 | 1.3 | 1.6 | 1.1 | 1.3 | 0.0 | 1.5 | 1.7 |
| 9.0 | 2.1 | 0.1 | 1.4 | 0.8 | 0.8 | 0.7 | 2.2 | −0.2 |
| 9.6 | 0.9 | 1.1 | 1.5 | 1.1 | 2.1 | 1.5 | 2.1 | 2.4 |
| 10.2 | 2.6 | 1.3 | 1.9 | 0.4 | 1.4 | 1.0 | 2.4 | 1.7 |
| 10.8 | 3.0 | 0.7 | 1.1 | 1.5 | 1.3 | 1.3 | 1.0 | 2.9 |
| 11.4 | 2.0 | 1.8 | 1.8 | 1.2 | 1.5 | 1.2 | 1.7 | 1.4 |

TABLE 6-continued

| Height | Dist. 5.0 | 7.9 | 12.6 | 19.9 | 31.5 | 50.0 | 79.2 | 125.6 |
|---|---|---|---|---|---|---|---|---|
| 12.0 | 1.6 | 0.9 | 2.5 | 1.0 | 1.9 | 1.2 | 1.5 | 2.3 |
| 12.6 | 2.2 | 1.8 | 0.2 | 2.7 | 1.0 | 1.5 | 1.9 | 1.7 |
| 13.2 | 1.4 | 0.8 | 1.3 | 1.4 | 0.7 | 0.8 | 1.1 | 1.0 |
| 13.8 | 1.7 | 1.4 | 1.6 | 1.0 | 0.4 | 1.0 | 0.7 | 1.5 |
| 14.4 | 1.9 | 2.4 | −0.1 | 0.6 | 1.0 | 1.4 | 1.3 | 1.3 |
| 15.0 | 2.1 | 1.9 | 0.9 | 1.7 | 0.7 | 0.5 | 2.6 | 1.3 |
| 15.6 | 0.3 | 0.2 | 1.1 | 1.2 | 2.3 | 1.6 | 0.9 | 1.8 |
| 16.2 | 1.5 | 0.5 | 1.8 | 0.4 | 1.4 | 0.1 | 1.2 | 2.0 |
| 16.8 | 0.5 | 1.4 | 1.5 | 1.8 | 1.2 | 0.7 | 1.5 | 1.7 |
| 17.4 | 1.4 | 0.5 | 1.3 | 2.1 | 1.6 | 1.2 | 1.6 | 1.9 |
| 18.0 | 2.1 | 2.0 | 1.6 | 0.9 | 1.5 | 1.7 | 0.2 | 0.7 |
| 18.6 | 1.3 | 1.5 | 1.6 | 1.8 | 2.3 | 2.2 | 1.2 | 1.7 |
| 19.2 | 1.1 | 0.9 | 0.8 | 1.8 | 2.0 | 1.1 | 1.8 | 1.3 |
| 19.8 | 1.4 | 1.4 | 0.2 | 1.3 | 1.1 | 0.8 | 3.1 | 1.1 |

TABLE 7

| Height | Dist. 5.0 | 7.9 | 12.6 | 19.9 | 31.5 | 50.0 | 79.2 | 125.6 |
|---|---|---|---|---|---|---|---|---|
| 1.2 | 0.3 | 0.9 | 1.6 | −0.4 | −0.1 | 0.8 | 2.0 | 2.1 |
| 1.8 | 1.4 | 0.5 | 1.3 | −0.5 | −0.2 | 0.7 | 1.3 | 2.6 |
| 2.4 | 1.9 | 0.0 | 1.1 | −0.2 | 0.0 | 0.4 | 2.2 | 2.1 |
| 3.0 | 1.2 | 1.0 | 0.6 | 0.4 | −0.2 | 2.4 | 2.4 | 1.8 |
| 3.6 | 1.3 | 0.3 | 0.9 | 0.4 | 1.2 | 1.9 | 2.7 | 2.6 |
| 4.2 | 1.0 | 1.8 | 1.1 | 1.7 | 1.6 | 0.8 | 0.6 | 1.4 |
| 4.8 | 2.6 | 1.2 | 1.3 | 0.2 | 1.6 | 1.1 | 1.1 | 2.6 |
| 5.4 | 1.3 | 0.3 | 1.9 | 0.7 | 0.9 | 2.0 | 1.5 | 1.1 |
| 6.0 | 1.6 | 1.3 | 0.6 | −0.3 | 0.4 | 0.3 | 1.9 | 0.7 |
| 6.6 | 1.8 | 1.2 | 1.6 | 0.9 | 1.2 | 2.3 | −0.3 | 1.4 |
| 7.2 | 1.5 | 2.4 | 1.9 | 1.3 | 2.5 | 0.8 | 1.1 | 1.5 |
| 7.8 | 2.2 | 2.9 | 3.3 | 0.4 | 2.0 | 1.0 | 1.0 | 1.9 |
| 8.4 | 1.0 | 1.7 | 2.3 | 1.1 | 1.3 | 0.4 | 0.9 | 1.3 |
| 9.0 | 1.4 | 1.9 | 2.5 | 2.4 | 0.6 | 1.0 | 1.5 | 0.5 |
| 9.6 | 2.7 | 1.3 | 1.0 | 1.6 | 1.4 | 1.5 | 0.5 | 2.1 |
| 10.2 | 0.9 | 2.1 | 1.7 | 1.4 | 0.7 | 0.5 | 1.3 | 2.2 |
| 10.8 | 2.3 | 2.8 | 0.8 | 1.4 | 0.3 | 1.0 | −0.1 | 1.8 |
| 11.4 | 2.8 | 1.6 | 1.4 | 1.8 | 0.8 | 2.1 | 1.4 | 2.3 |
| 12.0 | 1.3 | 2.1 | 0.4 | 1.6 | 0.6 | 1.4 | 1.0 | 1.1 |
| 12.6 | 1.2 | 1.3 | 2.0 | 0.6 | 1.8 | 1.3 | 1.6 | 1.8 |
| 13.2 | 1.8 | 1.8 | 2.3 | 2.1 | 1.5 | 0.9 | 2.5 | 1.4 |
| 13.8 | 2.4 | 1.5 | 0.5 | 2.0 | 1.2 | 1.5 | 1.7 | 0.9 |
| 14.4 | 1.3 | 2.4 | 1.3 | 0.2 | 0.5 | 1.2 | 2.1 | 1.5 |
| 15.0 | 1.6 | 1.3 | 0.4 | 0.9 | 1.0 | 2.1 | 3.8 | 1.3 |
| 15.6 | 1.6 | 1.4 | 1.3 | 2.1 | 1.4 | 1.6 | 1.5 | 0.9 |
| 16.2 | 2.2 | 2.3 | 1.4 | 2.0 | 1.4 | 1.6 | 1.5 | 0.5 |
| 16.8 | 1.7 | 1.6 | 2.6 | 0.8 | 1.3 | 0.9 | 2.1 | 0.3 |
| 17.4 | 2.2 | 2.2 | 1.0 | 0.5 | 0.3 | 0.6 | 1.3 | 0.7 |
| 18.0 | 1.6 | 1.7 | 1.7 | 1.1 | 0.7 | 0.2 | 1.2 | 2.0 |
| 18.6 | 1.7 | 2.7 | 2.5 | 2.9 | 2.0 | 1.4 | 2.1 | 2.6 |
| 19.2 | 2.4 | 2.1 | 1.4 | 1.1 | 1.5 | 1.6 | 1.8 | 1.9 |
| 19.8 | 1.2 | 1.8 | 0.8 | 1.2 | 1.9 | 2.1 | 1.3 | 0.9 |

TABLE 8

| Height | Dist. 5.0 | 7.9 | 12.6 | 19.9 | 31.5 | 50.0 | 79.2 | 125.6 |
|---|---|---|---|---|---|---|---|---|
| 1.2 | −2.0 | −0.7 | −2.0 | −1.1 | 0.5 | −0.5 | 0.1 | −0.4 |
| 1.8 | −2.1 | −0.6 | 0.1 | −0.8 | −1.1 | −1.7 | 0.0 | 0.3 |
| 2.4 | 0.1 | 0.3 | 0.5 | 1.5 | 0.3 | −1.3 | −0.6 | 0.4 |
| 3.0 | −1.0 | 1.1 | 0.0 | 1.1 | 0.6 | −0.2 | 0.4 | 0.0 |
| 3.6 | 0.8 | 1.7 | 0.6 | 0.4 | 0.3 | 0.1 | −1.2 | 0.5 |
| 4.2 | 0.6 | 1.5 | 0.5 | 1.3 | 1.8 | 0.5 | 1.2 | 0.5 |
| 4.8 | 1.3 | 1.4 | 1.3 | 0.9 | 1.8 | 0.9 | 0.1 | 1.0 |
| 5.4 | 2.1 | 1.2 | 0.9 | 1.3 | 1.9 | 0.9 | 1.1 | −0.2 |
| 6.0 | 0.6 | 1.7 | 2.1 | 2.6 | 2.0 | 0.5 | 0.8 | 0.3 |
| 6.6 | 1.9 | 0.6 | 2.4 | 0.9 | 1.5 | 0.8 | 1.5 | 0.5 |
| 7.2 | 1.2 | 0.7 | 1.6 | 2.0 | 1.5 | 0.3 | 1.1 | 0.0 |
| 7.8 | 1.1 | 1.2 | 1.2 | 1.4 | 1.4 | 0.7 | 1.4 | 0.5 |
| 8.4 | 1.5 | 2.1 | 1.7 | 2.1 | 1.4 | 0.9 | 1.3 | 0.7 |
| 9.0 | 0.8 | 1.6 | 1.3 | 2.0 | 1.9 | 1.1 | 0.6 | 0.5 |
| 9.6 | 1.0 | 0.7 | 1.2 | 0.8 | 2.2 | 1.5 | 0.2 | 1.3 |
| 10.2 | 2.1 | 1.5 | 1.2 | 1.0 | 1.9 | 1.3 | 0.9 | 1.6 |
| 10.8 | 0.7 | 1.0 | 0.8 | 1.7 | 1.0 | 1.8 | 1.0 | 1.8 |
| 11.4 | 2.1 | 1.4 | 1.4 | 1.0 | 2.3 | 1.0 | 0.6 | 1.0 |
| 12.0 | 1.6 | 1.2 | 1.4 | 0.8 | 0.5 | 0.3 | 0.6 | 1.0 |
| 12.6 | 1.6 | 0.7 | 1.4 | 2.2 | 1.7 | 1.2 | 0.2 | 1.8 |

TABLE 8-continued

| Height | Dist. 5.0 | 7.9 | 12.6 | 19.9 | 31.5 | 50.0 | 79.2 | 125.6 |
|---|---|---|---|---|---|---|---|---|
| 13.2 | 0.3 | 1.0 | 1.1 | 1.7 | 0.9 | 2.3 | 0.6 | 1.2 |
| 13.8 | 1.4 | 1.5 | 1.9 | 0.6 | 1.7 | 1.2 | 0.5 | 2.4 |
| 14.4 | 1.6 | 1.2 | 1.7 | 0.8 | 0.7 | 1.5 | 0.7 | 0.6 |
| 15.0 | 1.8 | 1.9 | 1.6 | 1.6 | 0.9 | 1.2 | 1.8 | 0.3 |
| 15.6 | 1.4 | 1.9 | 2.2 | 1.5 | 1.3 | 1.4 | 0.9 | 0.8 |
| 16.2 | 0.9 | 0.3 | 1.0 | 1.7 | 1.1 | 0.4 | 1.1 | 1.8 |
| 16.8 | 1.6 | 1.0 | 1.5 | 2.0 | 1.0 | 0.2 | 0.8 | 0.7 |
| 17.4 | 0.9 | 0.8 | 1.8 | 1.3 | 1.3 | 1.4 | 1.1 | 1.2 |
| 18.0 | 1.4 | 1.1 | 1.1 | 1.4 | 0.8 | 8.1 | 1.6 | 1.1 |
| 18.6 | 2.1 | 1.8 | 2.0 | 1.3 | 0.9 | 1.2 | 2.0 | 1.9 |
| 19.2 | 1.7 | 1.3 | 1.3 | 1.6 | 0.9 | 0.6 | 1.3 | 1.8 |
| 19.8 | 1.6 | 1.4 | 0.9 | 1.2 | 1.5 | 0.9 | 2.3 | 0.7 |

TABLE 9

| Height | Dist. 5.0 | 7.9 | 12.6 | 19.9 | 31.5 | 50.0 | 79.2 | 125.6 |
|---|---|---|---|---|---|---|---|---|
| 1.2 | 0.8 | 0.9 | 1.3 | 1.2 | 1.2 | 0.6 | 2.5 | 1.3 |
| 1.8 | 1.2 | 0.6 | 0.8 | 1.1 | 0.3 | 1.1 | 1.8 | 0.6 |
| 2.4 | 0.4 | 0.8 | 0.7 | 1.2 | 1.2 | 1.7 | 1.0 | 0.5 |
| 3.0 | 1.4 | 0.9 | 0.7 | 0.6 | 0.8 | 1.0 | 1.1 | 0.9 |
| 3.6 | 0.2 | 0.9 | 0.7 | 0.8 | 1.7 | 1.6 | 0.8 | 1.8 |
| 4.2 | 2.3 | 1.0 | 0.2 | 1.0 | 1.6 | 0.9 | 1.0 | 1.0 |
| 4.8 | 0.6 | 2.0 | 1.5 | 1.1 | 1.2 | 0.5 | 1.6 | 1.6 |
| 5.4 | 2.1 | 1.8 | 1.6 | 1.0 | 1.0 | 0.8 | 1.2 | 0.7 |
| 6.0 | 0.3 | 1.6 | 1.6 | 1.4 | 1.1 | 0.5 | 0.9 | 1.4 |
| 6.6 | 1.4 | 1.4 | 1.5 | 2.3 | 1.3 | 1.4 | 1.1 | 1.5 |
| 7.2 | 1.4 | 0.9 | 1.1 | 1.6 | 2.4 | 1.0 | 1.2 | 1.7 |
| 7.8 | 1.8 | 1.6 | 2.0 | 1.7 | 1.4 | 1.4 | 1.1 | 0.8 |
| 8.4 | 1.0 | 1.7 | 0.8 | 1.3 | 1.8 | 1.1 | 1.1 | 0.9 |
| 9.0 | 1.2 | 1.4 | 1.9 | 1.2 | 1.5 | 1.3 | 1.5 | 0.4 |
| 9.6 | 1.2 | 1.7 | 1.4 | 1.4 | 1.6 | 0.8 | 0.9 | 1.7 |
| 10.2 | 0.9 | 2.0 | 2.2 | 1.5 | 0.9 | 1.6 | 1.0 | 1.4 |
| 10.8 | 1.9 | 1.5 | 1.6 | 1.2 | 0.9 | 1.5 | 1.1 | 0.9 |
| 11.4 | 1.8 | 1.3 | 2.1 | 1.2 | 1.3 | 0.5 | 1.4 | 1.1 |
| 12.0 | 1.7 | 0.7 | 1.5 | 2.3 | 0.9 | 1.4 | 1.4 | 1.6 |
| 12.6 | 0.9 | 1.8 | 1.5 | 0.9 | 2.4 | 1.7 | 1.4 | 1.5 |
| 13.2 | 1.2 | 1.5 | 1.6 | 1.8 | 1.2 | 1.2 | 1.3 | 1.1 |
| 13.8 | 1.6 | 2.0 | 1.5 | 0.6 | 1.5 | 1.6 | 1.1 | 1.3 |
| 14.4 | 1.3 | 2.0 | 1.6 | 1.1 | 1.7 | 0.8 | 1.5 | 1.8 |
| 15.0 | 1.3 | 1.4 | 2.2 | 1.5 | 1.5 | 0.4 | 1.2 | 1.2 |
| 15.6 | 1.7 | 1.4 | 1.2 | 1.3 | 1.4 | 0.9 | 1.5 | 2.1 |
| 16.2 | 2.4 | 2.0 | 1.8 | 1.4 | 1.3 | 1.5 | 1.9 | 1.5 |
| 16.8 | 1.6 | 0.6 | 1.3 | 1.3 | 1.7 | 0.4 | 1.9 | 0.7 |
| 17.4 | 1.5 | 1.8 | 1.9 | 1.9 | 1.7 | 1.6 | 0.8 | 0.8 |
| 18.0 | 1.2 | 2.2 | 1.2 | 1.5 | 1.3 | 2.1 | 1.1 | 1.3 |
| 18.6 | 0.9 | 1.0 | 1.8 | 2.1 | 1.2 | 1.3 | 1.3 | 1.6 |
| 19.2 | 1.1 | 1.9 | 1.7 | 1.7 | 1.1 | 1.0 | 1.0 | 1.1 |
| 19.8 | 1.5 | 1.6 | 1.2 | 1.8 | 2.0 | 1.2 | 1.3 | 2.0 |

TABLE 10

| Height | Dist. 5.0 | 7.9 | 12.6 | 19.9 | 31.5 | 50.0 | 79.2 | 125.6 |
|---|---|---|---|---|---|---|---|---|
| 1.2 | 0.8 | 1.5 | 0.7 | 0.5 | 1.6 | 1.4 | 1.0 | 1.9 |
| 1.8 | −0.1 | 1.1 | 0.3 | 0.8 | 1.3 | 1.5 | 1.3 | 1.6 |
| 2.4 | −0.1 | 0.8 | 1.1 | 1.7 | 0.8 | 1.4 | 2.2 | 1.3 |
| 3.0 | 0.1 | 0.6 | 0.4 | 1.2 | 1.5 | 1.2 | 1.6 | 1.9 |
| 3.6 | 1.9 | 0.5 | 0.3 | 1.1 | 1.0 | 1.2 | 1.4 | 1.7 |
| 4.2 | 1.1 | 1.8 | 1.6 | 0.7 | 1.1 | 1.2 | 1.1 | 1.8 |
| 4.8 | 1.4 | 1.0 | 1.9 | 1.0 | 0.5 | 1.9 | 1.3 | 2.0 |
| 5.4 | 1.3 | 2.3 | 1.9 | 1.9 | 0.9 | 0.8 | 1.8 | 1.5 |
| 6.0 | 1.3 | 1.6 | 1.3 | 1.7 | 1.7 | 1.5 | 1.6 | 1.4 |
| 6.6 | 1.8 | 1.9 | 2.4 | 2.0 | 1.8 | 1.1 | 1.5 | 1.6 |
| 7.2 | 1.5 | 1.7 | 1.8 | 1.4 | 1.4 | 1.6 | 0.8 | 1.6 |
| 7.8 | 1.9 | 1.1 | 1.4 | 2.0 | 2.2 | 1.4 | 1.3 | 1.6 |
| 8.4 | 1.5 | 2.0 | 1.7 | 2.1 | 1.8 | 1.9 | 1.0 | 1.7 |
| 9.0 | 1.4 | 1.9 | 1.8 | 1.4 | 1.3 | 1.7 | 1.5 | 1.3 |
| 9.6 | 1.8 | 1.7 | 1.7 | 1.8 | 1.4 | 2.1 | 1.1 | 1.3 |
| 10.2 | 2.0 | 1.9 | 1.9 | 2.2 | 1.7 | 2.1 | 1.8 | 1.9 |
| 10.8 | 1.8 | 1.6 | 2.0 | 1.9 | 1.6 | 2.4 | 1.5 | 1.7 |
| 11.4 | 2.1 | 2.0 | 2.1 | 2.4 | 1.6 | 1.3 | 1.7 | 1.8 |
| 12.0 | 1.5 | 2.0 | 1.7 | 1.6 | 1.7 | 1.5 | 1.6 | 1.8 |
| 12.6 | 2.2 | 2.1 | 1.9 | 2.2 | 2.1 | 1.5 | 1.8 | 1.8 |
| 13.2 | 1.9 | 1.5 | 2.0 | 1.5 | 1.6 | 1.2 | 1.7 | 1.3 |
| 13.8 | 1.5 | 1.7 | 1.9 | 1.9 | 2.3 | 2.3 | 1.8 | 1.7 |

TABLE 10-continued

| Height | Dist. 5.0 | 7.9 | 12.6 | 19.9 | 31.5 | 50.0 | 79.2 | 125.6 |
|---|---|---|---|---|---|---|---|---|
| 14.4 | 1.6 | 1.7 | 1.9 | 2.2 | 1.5 | 1.8 | 2.1 | 2.1 |
| 15.0 | 2.1 | 1.7 | 2.0 | 2.4 | 2.2 | 2.2 | 2.2 | 1.2 |
| 15.6 | 2.2 | 1.8 | 1.8 | 2.1 | 2.1 | 2.0 | 1.6 | 1.6 |
| 16.2 | 1.8 | 2.0 | 1.7 | 1.9 | 1.8 | 2.2 | 1.4 | 1.6 |
| 16.8 | 1.5 | 1.6 | 1.6 | 1.7 | 1.8 | 2.3 | 2.2 | 1.3 |
| 17.4 | 1.5 | 1.7 | 1.9 | 2.0 | 1.9 | 2.1 | 1.7 | 1.4 |
| 18.0 | 1.5 | 1.1 | 1.9 | 2.1 | 1.6 | 2.2 | 1.7 | 1.8 |
| 18.6 | 1.2 | 2.0 | 2.1 | 1.8 | 2.1 | 2.0 | 1.7 | 1.8 |
| 19.2 | 2.1 | 1.9 | 1.6 | 2.1 | 2.1 | 2.0 | 2.2 | 1.6 |
| 19.8 | 1.3 | 2.0 | 1.7 | 2.1 | 2.3 | 2.1 | 1.9 | 2.2 |

As will be seen from the preceding Tables, the device provides a substantial improvement over a solid barrier while having the advantages previously set forth vis a vis a solid barrier. In the frequency range of 100 Hz for which the device was "tuned", there is a substantial improvement even at long distances from the device and at points above the device.

In the described embodiments, the device is particularly suited for controlling low frequency noise and can be modified in its construction as to the width of the elements, etc. to best control a particular low frequency which predominate in any particular application. Generally speaking, the elements should be relatively wide compared to the width of the passageways and to the duct width. This thus provides relatively long narrow ducts adjacent the passageways which slow the low frequency waves passing through.

The devices may be used whereever there is a noise source and this can include uses such as along highways, near locally generated noises such as transformers, etc. For highway use, the device is particularly advantageous in that the devices will shield areas adjacent the highway from sound even if one can see the noise while because of its openings, it will reduce the casting of shadow lighting and provide ventilation. In addition, the device can act as a safety barrier since the elements are generally made strong enough only to support themselves within the frame of a structure and thus can break on impact cushioning the effects of a crash.

In the illustrated embodiments, the ducts are shown as being open from top to bottom. In some instances, it may be advantageous to close the ducts such that a plurality of closed chambers are provided for each passageway.

As previously set forth, there are certain critical dimensions which may be varied in order to achieve control at a desired frequency. These parameters include the width of the passageway which is defined as the vertical distance between adjacent edges of adjacent elements; the vertical distance between two centers of adjacent elements; and the duct width. Each device would be optimumly tuned to the frequency which it is desired to control and to this end, the device is designed according to the formula:

$$0 = -\cot\frac{\pi fl}{c} + \frac{2fb}{c}\left\{ Ln\frac{1}{\sin\frac{\pi\delta}{2}} + \right.$$

-continued $$\left.\sum_{n=1}^{n=10}\left[\frac{\coth\left(\frac{n\pi l}{b}\right)F}{F}-1\right]\frac{\sin^2\pi n\delta}{n(\pi n\delta)^2}\right\}$$

wherein f=the desired frequency c=the sound propagation velocity $$F=\left[1-\left(\frac{bf}{nc}\right)^2\right]^{\frac{1}{2}}$$

n=takes the values from 1 to 10 in the series.

b=the vertical distance between the two centers of adjacent strips b'=the width of the passageways l=the horizontal distance between the strips $\delta=(b'/b)$ $Ln=\log_e$ As will be appreciated by those skilled in the art, one may achieve control of a desired frequency by varying the parameters as set forth above. In so doing, one would take into account other factors such as the overall size of the installation, the purpose thereof, the particular area to be protected, etc.

Utilizing the dipole approach previously set forth, one is able to achieve good results by placing the device on the ground; the results being comparable to placing the device above ground particularly when utilizing the embodiments such as FIGS. 11, 13 and 17.

It will be understood that the above-described embodiments are for purposes of illustration only and that changes and modifications may be made thereto without departing from the spirit and scope of the invention.

I claim:

1. A device adapted to reduce noise of a desired frequency, comprising a plurality of elements arranged in a plurality of rows to provide at least one passageway extending between said rows, the spacing of said elements from each other being arranged to cause a phase lag in noise of said desired frequency passing through said passageway by 180°, said elements being arranged to minimize diffraction of sound waves passing therethrough.

2. The device of claim 1 wherein the elements in said rows are aligned in columns to define generally vertically extending ducts.

3. The device of claim 1 wherein there are provided three passageways extending through said device, two of said passageways being adapted to cause a 180° phase lag in a sound wave passing therethrough, the third of said passageways being adapted to cause a 360° phase lag in a sound wave passing therethrough, one of said two passageways causing a 180° phase lag being situated proximate the top of the device.

4. A method of reducing noise of a desired frequency comprising placing a noise control device between the source of noise and the place where the noise is to be controlled, the device having a plurality of elements arranged in a plurality of rows, at least one passageway permitting the passage of noise therethrough formed between said rows of elements, arranging said elements according to the frequency of noise to be controlled according to the formula:

$$0=-\cot\frac{\pi fl}{c}+\frac{2fb}{c}\left\{Ln\frac{1}{\sin\frac{\pi\delta}{2}}+\right.$$

$$\left.\sum_{n=1}^{n=10}\left[\frac{\coth\left(\frac{n\pi l}{b}\right)F}{F}-1\right]\frac{\sin^2\pi n\delta}{n(\pi n\delta)^2}\right\}$$

wherein f=the desired frequency c=the sound propagation velocity $$F=\left[1-\left(\frac{bf}{nc}\right)^2\right]^{\frac{1}{2}}$$

n=takes the values from 1 to 10 in the series.

b=the vertical distance between the two centers of adjacent strips for open guides, or total width of the wave guide for closed guides b'=the width of the passageways l=the horizontal distance between the strips $\delta=(b'/b)$ $Ln=\log_e$.

5. A noise-reducing device comprising a plurality of elements arranged in a plurality of parallel rows from a bottom row to a top row, said plurality of rows being spaced apart so as to provide passageways therebetween permitting the passage of noise therethrough, each row between said bottom row and said top row having less elements than the previous row so as to provide a generally trapezoidally-shaped structure having non-parallel sides, one of said non-parallel sides being adapted to face a noise source, all of said elements having a certain width and each of said passageways having a certain width, the ratio of the width of the passageways to the width of the elements being between 1:10 to about 4:10.

6. The device according to claim 5 wherein said device has a narrow end and a wide end, with both of the non-parallel sides sloping outwardly from the narrow end to the wide end.

7. The device according to claim 5 wherein the elements in said rows are aligned in columns to define ducts extending between said parallel sides.

8. The device of claim 3 further including members extending between adjacent parallel elements to thereby provide a plurality of chambers open only to said passageways.

9. The device of claim 1 wherein there are provided three passageways extending through said device, a first passageway proximate the top of the device adapted to cause a 180° phase lag and a sound wave passing therethrough, a second passageway situated near the base of the device adapted to cause a 360° phase lag in a sound wave passing therethrough, and a third passageway proximate said second passageway adapted to cause a 180° phase lag in a sound wave passing therethrough.

10. The device of claim 2 wherein there are provided three passageways extending through said device, a first passageway proximate the top of the device adapted to cause a 180° phase lag and a sound wave passing therethrough, a second passageway situated near the base of the device adapted to cause a 360° phase lag in a sound wave passing therethrough, and a third passageway proximate said second passageway adapted to cause a 180° phase lag in a sound wave passing therethrough.

11. A method of reducing noise of a desired frequency comprising the step of placing a noise control device between the source of noise and the place where the noise is to be controlled, said device having a plurality of elements arranged in a plurality of rows, at least one passageway permitting the passage of noise therethrough formed between said rows of elements, and arranging said elements according to the frequency of the noise to be controlled according to the formula:

$$0 = -\cot\frac{\pi f l}{c} + \frac{2fb}{c}\left\{ Ln\frac{1}{\sin\frac{\pi\delta}{2}} + \sum_{n=1}^{n=10}\left[\frac{\coth\left(\frac{n\pi l}{b}\right)F}{F} - 1\right]\frac{\sin^2\pi n\delta}{n(\pi n\delta)^2}\right\}$$

wherein f=the desired frequency c=the sound propagation velocity $$F = \left[1 - \left(\frac{bf}{nc}\right)^2\right]^{\frac{1}{2}}$$

n=takes the values from 1 to 10 in the series.

b=the vertical distance between the two centers of adjacent strips for open guides, or total width of the wave guide for closed guides b'=the width of the passageways l=the horizontal distance between the strips $\delta=(b'/b)$ $Ln=\log_e$.

12. The method of claim 4 wherein there are provided three of said passageways, two of said passageways being arranged to cause a 180° phase lag in a sound wave passing therethrough, the third of said passageways being arranged to cause a 360° phase lag in a sound wave passing therethrough.

13. The method of claim 11 wherein there are provided three of said passageways, two of said passageways being arranged to cause a 180° phase lag in a sound wave passing therethrough, the third of said passageways being arranged to cause a 360° phase lag in a sound wave passing therethrough.

14. The method of claim 4 wherein the desired frequency is between 50 and 1600 Hz.

15. The method of claim 12 wherein the desired frequency is between 50 and 1600 Hz.

* * * * *